US009971143B2

United States Patent
Nishimura et al.

(10) Patent No.: US 9,971,143 B2
(45) Date of Patent: May 15, 2018

(54) INTERFERENCE FILTER AND MEMS ELEMENT HAVING CONNECTED FIRST AND SECOND GROOVES IN A MOVEABLE SUBSTRATE HAVING NON-UNIFORM THICKNESS

(71) Applicant: Seiko Epson Corporation, Tokyo (JP)

(72) Inventors: Teruyuki Nishimura, Matsumoto (JP); Tomoki Sakashita, Chino (JP)

(73) Assignee: Seiko Epson Corporation (JP)

( * ) Notice: Subject to any disclaimer, the term of this patent is extended or adjusted under 35 U.S.C. 154(b) by 197 days.

(21) Appl. No.: 14/340,954

(22) Filed: Jul. 25, 2014

(65) Prior Publication Data

US 2015/0029591 A1    Jan. 29, 2015

(30) Foreign Application Priority Data

Jul. 29, 2013    (JP) .................................. 2013-156420

(51) Int. Cl.
   *G02B 5/28*        (2006.01)
   *G02B 26/00*       (2006.01)
   *G01J 3/26*        (2006.01)

(52) U.S. Cl.
   CPC ............. *G02B 26/001* (2013.01); *G01J 3/26* (2013.01); *G02B 5/28* (2013.01); *G02B 5/284* (2013.01); *G02B 26/002* (2013.01); *G02B 26/007* (2013.01)

(58) Field of Classification Search
   None
   See application file for complete search history.

(56) References Cited

U.S. PATENT DOCUMENTS

| 2010/0142067 A1* | 6/2010 | Hanamura ........... G02B 26/001 359/850 |
| 2011/0228397 A1* | 9/2011 | Matsushita ............... G01J 3/26 359/578 |
| 2012/0086945 A1* | 4/2012 | Hirokubo .................. G01J 3/26 356/450 |
| 2012/0206731 A1 | 8/2012 | Sano et al. |
| 2014/0240837 A1 | 8/2014 | Nishimura |

FOREIGN PATENT DOCUMENTS

| JP | 2010-139552 A | 6/2010 |
| JP | 2012-150193 A | 8/2012 |
| JP | 2012-168438 A | 9/2012 |
| JP | 2012-173349 A | 9/2012 |
| JP | 2012-252088 A | 12/2012 |
| JP | 2013-076777 A | 4/2013 |
| JP | 2014-164068 A | 9/2014 |

* cited by examiner

*Primary Examiner* — Stephone B Allen
*Assistant Examiner* — Ryan S Dunning
(74) *Attorney, Agent, or Firm* — Harness, Dickey & Pierce, P.L.C.

(57) ABSTRACT

A wavelength variable interference filter includes a fixed substrate, a movable substrate that faces the fixed substrate, a pair of reflective films, a fixed extraction electrode provided on the fixed substrate, and a movable connection electrode that is provided on the movable substrate and is in contact with the fixed extraction electrode at a connection position, in which the movable substrate includes a first groove that is provided at the connection position in a plan view in which the fixed substrate and the movable substrate are viewed from a substrate thickness direction, and a second groove that has a larger area than an area of the first groove in the plan view and is connected to the first groove.

15 Claims, 16 Drawing Sheets

INTERFERENCE FILTER AND MEMS ELEMENT HAVING CONNECTED FIRST AND SECOND GROOVES IN A MOVEABLE SUBSTRATE HAVING NON-UNIFORM THICKNESS

BACKGROUND

1. Technical Field

The present invention relates to an interference filter, an optical filter device, an optical module, an electronic apparatus, a manufacturing method of the interference filter, and a MEMS element.

2. Related Art

In the related art, various Micro Electro Mechanical System (MEMS) elements are known, such as an interference filter in which reflective films are respectively disposed so as to face each other with a predetermined gap on surfaces of a pair of substrates facing each other, a mirror element in which a reflective film is disposed on a substrate, or a piezoelectric vibration element in which a piezoelectric body such as a quartz crystal vibrator element is disposed on a substrate.

In addition, as an example of the MEMS element, a wavelength variable interference filter is known in which electrodes are respectively provided on a pair of substrates and which includes an extraction electrode extracted from the electrode provided on one substrate, an extraction electrode provided on the other substrate, and a connection portion which brings the extraction electrodes into contact with each other for electrical connection (for example, refer to JP-A-2012-168438).

The wavelength variable interference filter disclosed in JP-A-2012-168438 is an example of the MEMS element, and the wavelength variable interference filter includes a pair of substrates (a fixed substrate and a movable substrate) on which driving electrodes are respectively provided. The fixed substrate is provided with a protrusion which protrudes toward the movable substrate, and a conduction electrode which extends from an end surface on the movable substrate side of the protrusion to an outer circumferential edge the fixed substrate. In addition, in the movable substrate, a groove is provided through etching at a position corresponding to the protrusion on a surface on an opposite side to the surface facing the fixed substrate, and a bottom of the groove is a thin portion which is flexible. Further, the extraction electrode is provided on the surface of the movable substrate facing the fixed substrate from the driving electrode to the thin portion, and the conduction electrode on the protrusion is in contact with the extraction electrode on the thin portion. In this case, the thin portion is elastically deformed, and thus contact pressure of the extraction electrode and the conduction electrode improves so that connection reliability is ensured. In addition, the thin portion is deflected so that parallelism between the pair of substrates is maintained.

However, in a case where the groove is formed through etching in the wavelength variable interference filter disclosed in JP-A-2012-168438, unless an area of the groove is sufficiently secured in a plan view in which the wavelength variable interference filter is viewed from a thickness direction, an etchant does not sufficiently flow to a deep part of the groove, and it is not easy to make the thin portion sufficiently thin.

In a case where the thin portion cannot be made sufficiently thin, deflection of the thin portion becomes insufficient, and thus the movable substrate is deflected by a pressing force of the protrusion, or the movable substrate is tilted with respect to the fixed substrate.

SUMMARY

An advantage of some aspects of the invention is to provide an interference filter capable of minimizing deflection of a substrate, an optical filter device, an optical module, an electronic apparatus, a manufacturing method of the interference filter, and a MEMS element.

An aspect of the invention is directed to an interference filter including a first substrate; a second substrate that faces the first substrate; a first reflective film that is provided on the first substrate and reflects some incident light beams therefrom and transmits other incident light beams therethrough; a second reflective film that is provided on the second substrate, faces the first reflective film, and reflects some of the incident light beams therefrom and transmits the other incident light beams therethrough; a first electrode that is provided on the first substrate; and a second electrode that is provided on the second substrate and is in contact with the first electrode at a connection position, in which the second substrate includes a first groove that is provided at the connection position in a plan view in which the first substrate and the second substrate are viewed from a substrate thickness direction, and a second groove that has a larger area than an area of the first groove in the plan view and is connected to the first groove.

In the aspect of the invention, in the second substrate, the first groove is provided at the connection position in a plan view (hereinafter, simply referred to as a plan view) in which the first substrate and the second substrate are viewed from a thickness direction.

Therefore, a groove bottom (first bottom) of the first groove is deflected, and thus stress when the first electrode and the second electrode come into pressing contact with each other can be released, thereby minimizing deflection or tilting of the second substrate.

Here, in the second substrate, the second groove is connected to the first groove and has a larger area than an area of the first groove in the plan view. The first groove and the second groove can be simultaneously formed through wet etching, and thus the first groove and the second groove are connected to each other when the wet etching is performed. At this time, the first groove and the second groove are connected to each other, and thus an etchant flows from the second groove into the first groove so that circulation of the etchant is promoted. Accordingly, the etchant can be sufficiently supplied to a deep part of the first groove, and thus the etching in the first groove can be made to completely progress so that a thickness of the first bottom can be made thin enough. Therefore, as described above, when the first electrode and the second electrode are brought into contact with each other, it is possible to minimize deflection or tilting of the second substrate, and to form the first groove with a thickness dimension which allows a contact pressure due to an elastic force to be sufficiently secured. Further, it is possible to minimize deflection or tilting in the first reflective film or the second reflective film and thus to prevent a reduction in a spectral performance.

It is preferable that the interference filter includes a connection portion that connects a first bottom of the first groove to a second bottom of the second groove, and is coplanar with the first bottom and the second bottom.

According to this configuration, there is provided the connection portion that connects the first bottom of the first groove to the second bottom of the second groove.

Typically, in a case where the first groove and the second groove are formed through etching, a resist which has openings corresponding to a groove bottom surface (first bottom) of the first groove and a groove bottom surface (second bottom) of the second groove is formed on the first substrate, and then wet etching is performed thereon. In this case, the wet etching progresses, and it is difficult to etch the first groove having the smaller area than that of the second groove until the first groove and the second groove are connected to each other through side etching. As a result, a groove depth of the first groove becomes smaller than a groove depth of the second groove.

In contrast, in the aspect of the invention, a groove which allows the first bottom, the second bottom, and the connection portion to be coplanar with each other is formed through the wet etching. In this case, a resist which has openings corresponding to the first bottom, the second bottom, and the connection portion connecting the bottoms to each other is formed, and then the wet etching is performed thereon. Accordingly, the first groove, the second groove, and the connection portion are etched at the same rate, and thus the first groove, the second groove, and the connection portion have the same groove depth. Therefore, it is possible to sufficiently secure a groove depth of the first groove, and thus to sufficiently ensure flexibility of the first bottom.

In addition, for example, in a case where a movable portion is held by the second groove and is displaced in the thickness direction, preferably, stress applied to the first groove by a protrusion is hardly transferred to the second groove. In the aspect of the invention, the connection portion is provided, and thus the first groove and the second groove can be provided at positions which are separated from each other, thereby minimizing the transfer of the stress to the second groove.

In the interference filter according to the aspect of the invention, it is preferable that the connection portion is provided in a direction of a straight line which connects the first bottom to the second bottom in the shortest distance in the plan view.

According to this configuration, the connection portion is provided in the direction of the straight line which connects the first bottom to the second bottom in the shortest distance, that is, in a linear shape having a predetermined width dimension. Accordingly, it is possible to reduce an area of the connection portion in the plan view. Therefore, it is possible to prevent a reduction in rigidity of the second substrate due to the connection portion and thus to minimize deflection of the second substrate.

In the interference filter of the aspect of the invention, it is preferable that the second substrate includes a thick portion that is provided between the first groove and the second groove and has a larger thickness dimension than a thickness dimension of the first groove and the second groove, and the connection portion is provided so as to go around the thick portion in the plan view.

According to this configuration, the thick portion is provided between the first groove and the second groove which are separated from each other, and the connection portion is provided so as to go around the thick portion. In this case, even in a case where the first bottom pressed to the protrusion is deformed, stress thereof is hardly transferred to the second groove due to the thick portion. Therefore, it is possible to minimize a fluctuation in a gap dimension between the reflective films (hereinafter, also referred to as a gap dimension) due to the application of the stress to the second bottom, and thus to control the gap dimension with high accuracy.

In the interference filter according to the aspect of the invention, it is preferable that the connection portion has a dimension in a width direction intersecting a connecting direction, the dimension being smaller than a dimension of the first bottom in the width direction at a position where the first bottom and the connection portion are connected to each other in the plan view.

Here, the dimension in the width direction (width dimension) of the connection portion is a dimension of the connection portion in a direction (for example, a perpendicular direction) intersecting a direction (connecting direction) in which the connection portion connects the first bottom to the second bottom in the plan view. In addition, the connection portion includes not only one which linearly connects the first bottom to the second bottom in the plan view, but also one which has a curved part or a bent part in the plan view. In the curved part of the connection portion, a tangential direction is a connecting direction.

According to this configuration, a width dimension of the connection portion is made smaller than a width dimension of the first bottom, and thus it is possible to further reduce an area of the connection portion in the plan view. Therefore, it is possible to further prevent a reduction in a rigidity of the second substrate due to the connection portion being provided, and thus to further minimize deflection of the second substrate.

In the interference filter according to the aspect of the invention, it is preferable that the second substrate includes a movable portion provided with the second reflective film, and the second groove holds the movable portion movably in the thickness direction.

According to this configuration, in the interference filter, the movable portion provided with the second reflective film is held by the second groove, and can be moved in the thickness direction. This interference filter forms a wavelength variable interference filter which allows a gap dimension to be changed.

According to this configuration, it is possible to simultaneously form the first groove and the second groove which hold the movable portion. In other words, a groove which holds the movable portion so that the movable portion can advance or retract can be used as the second groove, and thus it is not necessary to form a separate groove in order to secure a sufficient etching depth of the first groove. Accordingly, it is possible to simplify manufacturing steps of the wavelength variable interference filter and thus to minimize a manufacturing cost.

It is preferable that the interference filter further includes a third groove that has a same shape as the first groove, the second groove has a rotationally symmetrical shape in the plan view, and the first groove and the third groove are provided at positions which are rotationally symmetrical to each other with respect to a symmetrical center of the second groove.

According to this configuration, the second groove holding the movable portion has a rotationally symmetrical shape, and the first groove and the third groove are provided so as to be rotationally symmetrical to each other with respect to a symmetrical center thereof.

Accordingly, it is possible to minimize bias of a stress of the second substrate. Therefore, it is possible to prevent a reduction in accuracy of a gap dimension due to the bias of the stress and thus to provide a wavelength variable interference filter having a high spectral performance.

Another aspect of the invention is directed to an optical filter device including an interference filter and a casing that stores the interference filter therein, the interference filter including a first substrate; a second substrate that faces the first substrate; a first reflective film that is provided on the first substrate and reflects some incident light beams therefrom and transmits other incident light beams therethrough; a second reflective film that is provided on the second substrate, faces the first reflective film, and reflects some of the incident light beams therefrom and transmits the other incident light beams therethrough; a first electrode that is provided on the first substrate; and a second electrode that is provided on the second substrate and is in contact with the first electrode at a connection position, in which the second substrate includes a first groove that is provided at the connection position in a plan view in which the first substrate and the second substrate are viewed from a substrate thickness direction, and a second groove that has a larger area than an area of the first groove in the plan view and is connected to the first groove.

In this aspect of the invention, in the same manner as in the aspect described above, the first groove connected to the second groove is provided on the second substrate. Therefore, a groove bottom of the first groove is deflected, and therefore it is possible to minimize deflection or tilting of the second substrate and thus to provide an optical filter device having a high spectral performance.

In addition, since the interference filter is stored in the casing, it is possible to prevent deterioration in the reflective films due to gases or the like included in the air or attachment of foreign substances thereto.

Still another aspect of the invention is directed to an optical module including a first substrate; a second substrate that faces the first substrate; a first reflective film that is provided on the first substrate and reflects some incident light beams therefrom and transmits other incident light beams therethrough; a second reflective film that is provided on the second substrate, faces the first reflective film, and reflects some of the incident light beams therefrom and transmits the other incident light beams therethrough; a first electrode that is provided on the first substrate; a second electrode that is provided on the second substrate and is in contact with the first electrode at a connection position; and a detection unit that detects light extracted by a first reflective film and a second reflective film, in which the second substrate includes a first groove that is provided at the connection position in a plan view in which the first substrate and the second substrate are viewed from a substrate thickness direction, and a second groove that has a larger area than an area of the first groove in the plan view and is connected to the first groove.

In this aspect of the invention, in the same manner as in the aspects described above, the first groove connected to the second groove is provided on the second substrate. Therefore, a groove bottom of the first groove is deflected, and therefore it is possible to minimize deflection or tilting of the second substrate and thus to provide an optical module having a high spectral performance.

Yet another aspect of the invention is directed to an electronic apparatus including an interference filter and a control unit that controls the interference filter, the interference filter including a first substrate; a second substrate that faces the first substrate; the first reflective film that is provided on the first substrate and reflects some incident light beams therefrom and transmits other incident light beams therethrough; the second reflective film that is provided on the second substrate, faces the first reflective film, and reflects some of the incident light beams therefrom and transmits the other incident light beams therethrough; a first electrode that is provided on the first substrate; and a second electrode that is provided on the second substrate and is in contact with the first electrode at a connection position, in which the second substrate includes a first groove that is provided at the connection position in a plan view in which the first substrate and the second substrate are viewed from a substrate thickness direction, and a second groove that has a larger area than an area of the first groove in the plan view and is connected to the first groove.

In this aspect of the invention, in the same manner as in the aspects described above, the first groove connected to the second groove is provided on the second substrate. Therefore, a groove bottom of the first groove is deflected, and therefore it is possible to minimize deflection or tilting of the second substrate and thus to provide an electronic apparatus having a high spectral performance.

Still yet another aspect of the invention is directed to a manufacturing method of an interference filter which includes a first substrate; a second substrate that faces the first substrate; a first reflective film that reflects some incident light beams therefrom and transmits other incident light beams therethrough; a second reflective film that is provided on the second substrate, faces the first reflective film, and reflects some incident light beams therefrom and transmits other incident light beams therethrough; a first electrode that is provided on the first substrate; and a second electrode that is provided on the second substrate, in which the first electrode is connected to a second electrode at a connection position. The method includes forming the first substrate, and forming the first electrode in a region of the first substrate which overlaps at least the connection position; forming a mask pattern which includes at least a first opening which overlaps the connection position of the second substrate when the second substrate faces the first substrate in a plan view in which the second substrate is viewed from a thickness direction, and a second opening which has a larger area than an area of the first opening in the plan view at a position different from a position of the first opening; connecting a first groove corresponding to the first opening to a second groove corresponding to the second groove through wet etching; forming the second electrode in a region of the second substrate which overlaps at least the connection position; and bringing the first electrode into contact with the second electrode at the connection position.

In this aspect of the invention, the first groove and the second groove which are connected to each other are simultaneously formed through wet etching. At this time, as described above, an etchant flows from the second groove into the first groove so that circulation of the etchant is promoted, and thus etching in the first groove fully progresses. Accordingly, since a thickness of the first bottom can be made thin enough, as described above, when the first electrode and the second electrode is brought into contact with each other, it is possible to minimize deflection or tilting of the second substrate.

In addition, according to this aspect of the invention, the first groove having the first bottom and the second groove are simultaneously formed through etching. Accordingly, it is possible to reduce the number of manufacturing steps and thus to minimize a manufacturing cost as compared with in a case where the first groove and the second groove are formed in different steps. Therefore, it is possible to manufacture the above-described interference filter with high reliability while minimizing a manufacturing cost.

In the manufacturing method of an interference filter, it is preferable that, in the forming of the mask pattern, the mask pattern including a third opening which connects the first opening to the second opening is formed.

According to this aspect of the invention, the first bottom of the first groove corresponding to the first opening is connected to the second bottom of the second groove corresponding to the second opening via the connection portion corresponding to the third opening. Accordingly, the first groove, the second groove, and the connection portion are etched at the same rate, and thus a groove which allows the first bottom, the second bottom, and the connection portion to be coplanar with each other can be formed. In other words, an etchant can be made to flow from the first groove toward the second groove via the connection portion, and thus it is possible to prevent the etchant from remaining in the first groove. In the interference filter manufactured in the above-described way, a groove depth of the first groove is sufficiently secure, and thus flexibility of the first bottom is completely ensured. Therefore, it is possible to manufacture the above-described interference filter with high reliability.

Further another aspect of the invention is directed to a MEMS element including a first substrate; a second substrate that faces the first substrate; a first electrode that is provided on the first substrate; and a second electrode that is provided on the second substrate and is in contact with the first electrode at a connection position, in which the second substrate includes a first groove that is provided at the connection position in a plan view in which the first substrate and the second substrate are viewed from a substrate thickness direction, and a second groove that has a larger area than an area of the first groove in the plan view and is connected to the first groove.

In this aspect of the invention, in the same as in the aspects described above, the first groove connected to the second groove is provided on the second substrate. Therefore, a groove bottom of the first groove is deflected, and thus it is possible to minimize deflection or tilting of the second substrate.

In addition, as described above, when the first electrode and the second electrode are brought into contact with each other, it is possible to minimize deflection or tilting of the second substrate, and to form the first groove with a thickness dimension which allows contact pressure due to an elastic force to be sufficiently secured.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described with reference to the drawings.

Configuration of Spectrometry Apparatus

Figure 1:
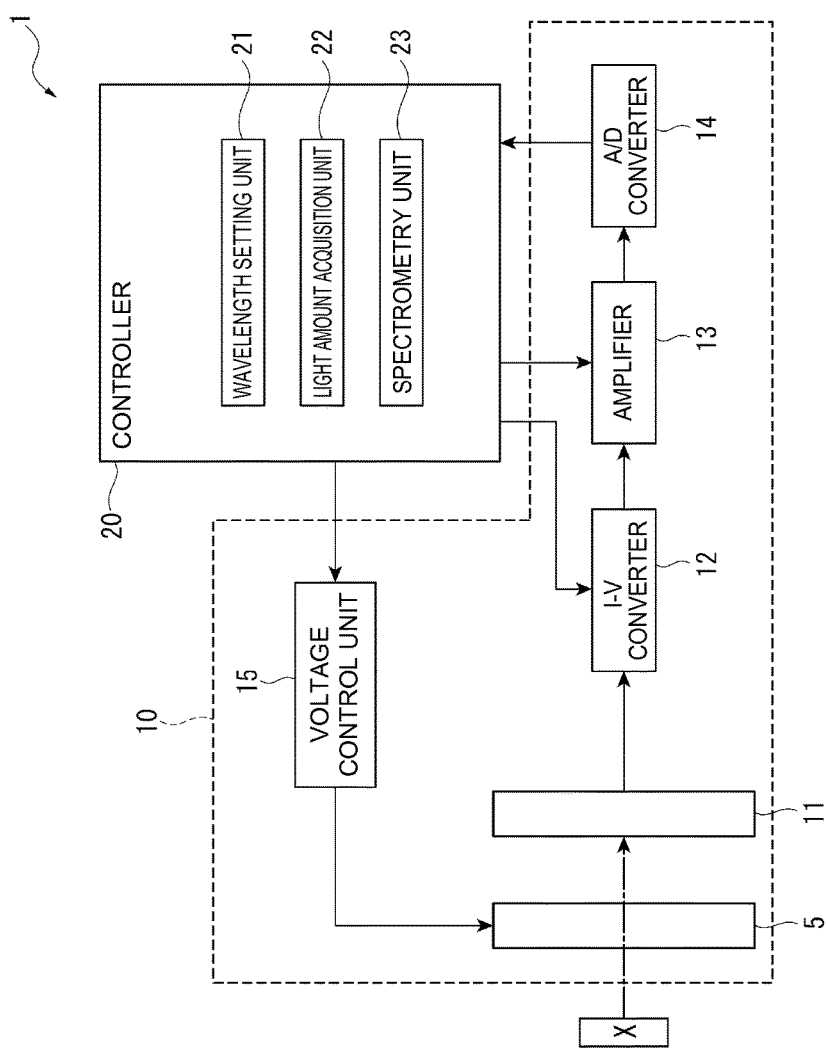
FIG. 1 is a block diagram illustrating a schematic configuration of a spectrometry apparatus according to a first embodiment.

FIG. 1 is a block diagram illustrating a schematic configuration of the spectrometry apparatus of the first embodiment according to the invention.

The spectrometry apparatus 1 is an example of an electronic apparatus according to the invention, and is an apparatus which analyzes a light intensity of each wavelength in measurement target light reflected by a measurement target X so as to measure an optical spectrum. In addition, in the present embodiment, a description is made of an example in which measurement target light reflected by the measurement target X is measured, but, for example, in a case of using a light emitting body such as a liquid crystal panel as the measurement target X, light emitted from the light emitting body may be used as measurement target light.

As illustrated in FIG. 1, the spectrometry apparatus 1 includes an optical module 10, and a controller 20 which processes a signal output from the optical module 10.

Configuration of Optical Module

The optical module 10 includes a wavelength variable interference filter 5, a detector 11, an I-V converter 12, an amplifier 13, an A/D converter 14, and a voltage control unit 15.

In the optical module 10, the measurement target light reflected by the measurement target X is guided to the wavelength variable interference filter 5 through an incidence optical system (not illustrated), and the light which passes through the wavelength variable interference filter 5 is received by the detector 11. In addition, a detection signal output from the detector 11 is output to the controller 20 via the I-V converter 12, the amplifier 13, and the A/D converter 14.

Configuration of Wavelength Variable Interference Filter

Next, a description will be made of the wavelength variable interference filter 5 incorporated into the optical module 10.

Figure 2:
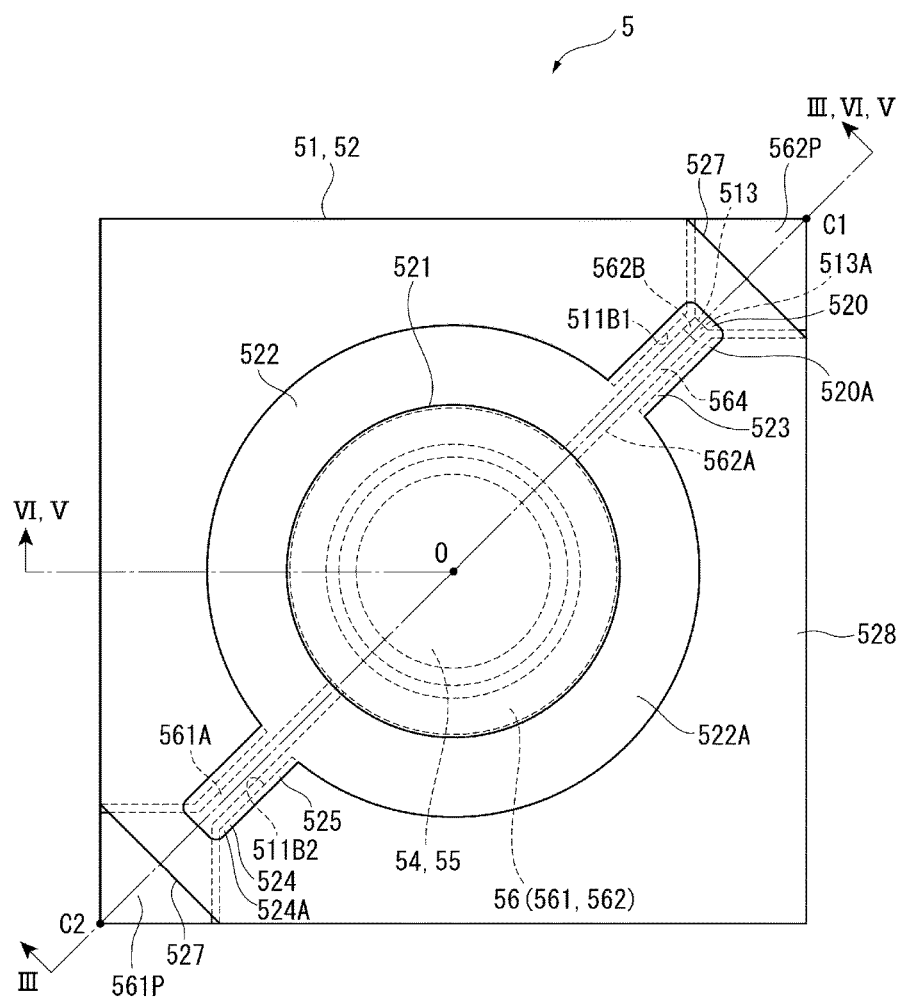
FIG. 2 is a plan view illustrating a schematic configuration of a wavelength variable interference filter according to the embodiment.
Figure 3:
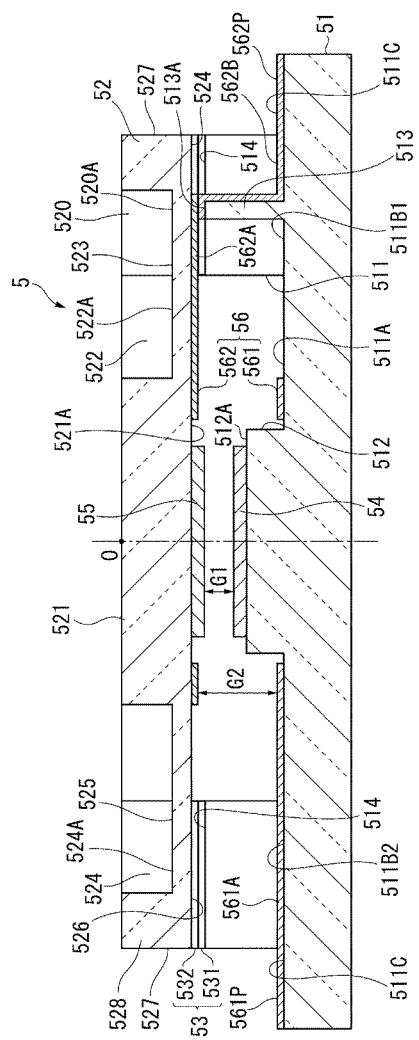
FIG. 3 is a cross-sectional view illustrating a schematic configuration of the wavelength variable interference filter according to the embodiment.

FIG. 2 is a plan view illustrating a schematic configuration of the wavelength variable interference filter 5. FIG. 3 is a cross-sectional view taken along the line III-III in FIG. 2.

As illustrated in FIGS. 2 and 3, the wavelength variable interference filter 5 includes a fixed substrate 51 forming a first substrate and a movable substrate 52 forming a second substrate. Each of the fixed substrate 51 and the movable substrate 52 is made of, for example, various kinds of glass such as soda glass, crystalline glass, quartz glass, lead glass, potassium glass, borosilicate glass, and alkali-free glass, quartz crystal, or the like. In addition, a first joining surface 514 of the fixed substrate 51 and a second joining surface 526 of the movable substrate 52 are joined to each other, for example, via a joining film 53 which is formed of a plasma polymerization film or the like having siloxane as a main component, and thus the two substrates are integrally formed.

A fixed reflective film 54 forming a first reflective film according to the invention is provided on the surface of the fixed substrate 51 facing the movable substrate 52, and a movable reflective film 55 forming a second reflective film according to the invention is provided on the surface of the movable substrate 52 facing the fixed substrate 51. The fixed reflective film 54 and the movable reflective film 55 are disposed so as to face each other with a gap G1.

The wavelength variable interference filter 5 is provided with an electrostatic actuator 56 which is an example of a gap changing portion according to the invention, used to adjust (change) of a gap dimension of the gap G1. In the electrostatic actuator 56, a dimension of the gap G1 can be easily changed by an electrostatic attraction by applying a predetermined voltage between opposing electrodes, and thus it is possible to simplify a configuration thereof. The electrostatic actuator 56 can be driven under the control of the voltage control unit 15.

In addition, in the following description, a plan view in which the wavelength variable interference filter 5 is viewed from the substrate thickness direction of the fixed substrate 51 or the movable substrate 52, that is, a plan view in which the wavelength variable interference filter 5 is viewed from a stacking direction of the fixed substrate 51 and the movable substrate 52 is referred to as a filter plan view. Further, in the present embodiment, a central point of the fixed reflective film 54 and a central point of the movable reflective film 55 match each other in the filter plan view; the central point of the reflective film in a plan view is referred to as a plane central point O; and a straight line passing through the central points of the reflective films is referred to as a central axis.

Configuration of Fixed Substrate

The fixed substrate 51 is formed in a larger thickness dimension than that of the movable substrate 52, and thus there is no deflection of the fixed substrate 51 due to an electrostatic attraction caused by the electrostatic actuator 56 or an internal stress of a film member (for example, the fixed reflective film 54 or the like) formed on the fixed substrate 51.

The fixed substrate 51 is provided with an electrode arrangement groove 511 and a reflective film installation portion 512 which are formed, for example, through etching or the like, as illustrated in FIGS. 2 and 3.

The electrode arrangement groove 511 is formed in an annular shape centering on the plane central point O of the fixed substrate 51 in the filter plan view. The reflective film installation portion 512 is formed so as to protrude toward the movable substrate 52 side from the central part of the electrode arrangement groove 511 in the filter plan view. A groove bottom surface of the electrode arrangement groove 511 is an electrode installation surface 511A on which a fixed electrode 561 forming the electrostatic actuator 56 is disposed. In addition, a protruding front end surface of the reflective film installation portion 512 is a reflective film installation surface 512A on which the fixed reflective film 54 is disposed.

Further, the fixed substrate 51 is provided with electrode extraction grooves 511B1 and 511B2 which extend from the electrode arrangement groove 511 toward vertexes of the fixed substrate 51. Specifically, the fixed substrate 51 is provided with the electrode extraction groove 511B1 which extends toward a vertex C1 of the fixed substrate 51 and the electrode extraction groove 511B2 which extends toward a vertex C2 in an opposite direction to the electrode extraction groove 511B1. Here, the electrode extraction grooves 511B1 and 511B2 extend up to the vertexes of the fixed substrate 51; an electrode connection portion 511C is provided at the extending front end; and a surface of the electrode connection portion 511C on the movable substrate 52 side is coplanar with the electrode installation surface 511A of the electrode arrangement groove 511.

A protrusion 513 which protrudes toward the movable substrate 52 (in a direction separated from the fixed substrate 51) is provided in the electrode extraction groove 511B1. A front end surface 513A of the protrusion 513 in the protruding direction is formed on a planarized surface which is parallel to the electrode installation surface 511A. The front end surface 513A of the protrusion 513 is coplanar with the joining surface 514.

The fixed electrode 561 forming the electrostatic actuator 56 is provided on the electrode installation surface 511A of the electrode arrangement groove 511. The fixed electrode 561 may be directly provided on the electrode installation surface 511A, and may be provided on another thin film (layer) which is provided on the electrode installation surface 511A.

More specifically, the fixed electrode 561 is formed in an annular shape centering on the plane central point O. In addition, the fixed electrode 561 is connected to a fixed extraction electrode 561A. The fixed extraction electrode 561A is provided from the fixed electrode 561 to the electrode connection portion 511C at the outer circumferential edge of the fixed substrate 51 on the vertex C2 side, along the electrode extraction groove 511B2. A fixed electrode pad 561P is formed at a front end of the fixed extraction electrode 561A, and the fixed electrode pad 561P is connected to the voltage control unit 15 (refer to FIG. 1). A material for forming the fixed electrode 561 and the fixed extraction electrode 561A may include, for example, indium tin oxide (ITO).

A movable connection electrode 562B corresponding to a first electrode according to the invention is provided in the electrode extraction groove 511B1. The movable connection electrode 562B is provided from the front end surface 513A of the protrusion 513 to the electrode connection portion 511C at the outer circumferential edge of the fixed substrate 51 on the vertex C1 side, along the electrode extraction groove 511B1. A movable electrode pad 562P is formed at a front end of the movable connection electrode 562B, and the movable electrode pad 562P is connected to the voltage control unit 15 (refer to FIG. 1).

An insulating film may be formed on a surface of the fixed electrode 561.

In addition, in the present embodiment, a configuration in which a single fixed electrode 561 is provided on the electrode installation surface 511A is described, but, for example, a configuration (double electrode configuration) or the like in which two electrodes forming concentric circles centering on the plane central point O are provided may be employed.

As described above, the reflective film installation portion 512 is formed in a substantially columnar shape having a smaller diameter dimension than that of the electrode arrangement groove 511 on the same axis as the electrode arrangement groove 511, and is provided with the reflective film installation surface 512A facing the movable substrate 52. The reflective film installation portion 512 is provided with the fixed reflective film 54.

The fixed reflective film 54 may be directly provided on the reflective film installation portion 512, and may be provided on another thin film (layer) which is provided on the reflective film installation portion 512. As the fixed reflective film 54, for example, a metal film such as Ag, or a conductive alloy film such as an Ag alloy may be used. In a case of using the metal film such as Ag, a protective film may be preferably formed in order to minimize deterioration of Ag.

In addition, for example, a dielectric multilayer film which has a high refractive index layer made of $TiO_2$ and a low refractive index layer made of $SiO_2$ and is formed by alternately laminating the high refractive index layer and the low refractive index layer may be used, and a reflective film in which a dielectric multilayer film and a metal film are laminated, a reflective film in which a dielectric single layer and an alloy film are laminated, or the like may be used.

Further, an antireflective film may be formed at a position corresponding to the fixed reflective film 54 on a light incidence surface (a surface on which the fixed reflective film 54 is not provided) of the fixed substrate 51. This antireflective film may be formed, for example, by alternately laminating a low refractive index film and a high refractive index film, and increases transmittance by reducing reflectance of visible light on the surface of the fixed substrate 51.

Configuration of Movable Substrate

The movable substrate 52, as illustrated in FIGS. 2 and 3, includes a first groove 520 provided at a position which overlaps the protrusion 513 (contact position) in the filter plan view; a movable portion 521 which has a circular shape centering on the plane central point O in the filter plan view; a second groove 522 which has an annular shape centering on the plane central point O in the same manner as the movable portion 521 and surrounds the movable portion 521; a first connection portion 523 which connects the first groove 520 to the second groove 522; a third groove 524 which has the same shape as the first groove 520; a second connection portion 525 which connects the second groove 522 to the third groove 524; and a substrate outer circumferential portion 528 which is provided outside the second groove 522.

The first groove 520 is provided at least at a position overlapping the protrusion 513 in the filter plan view. The first groove 520 is provided with a flexible first bottom 520A which has a smaller thickness dimension than those of the surroundings thereof and is deformable in the thickness direction of the movable substrate 52.

The second groove 522 is provided in an annular shape around the movable portion 521. A second bottom 522A forming a bottom surface of the second groove 522 is formed in a smaller thickness dimension than that of the movable portion 521 or the substrate outer circumferential portion 528. An inner edge of the second bottom 522A is connected to the movable portion 521, and an outer edge thereof is connected to the substrate outer circumferential portion 528, thereby holding the movable portion 521. The second bottom 522A has flexibility so as to be deformable in the thickness direction of the movable substrate 52, and forms a diaphragm which holds the movable portion 521 so that the movable portion 521 can be moved in the thickness direction.

The first connection portion 523 is provided along a virtual straight line L which passes through the vertexes C1 and C2 and the plane central point O. The first connection portion 523 is a thin portion which linearly connects the first bottom 520A of the first groove 520 to the second bottom 522A of the second groove 522. A surface (hereinafter, also referred to as an upper surface) of the first connection portion 523 on an opposite side to the fixed substrate 51 is coplanar with the bottoms of the first groove 520 and the second groove 522. In other words, the first connection portion 523, the first bottom 520A, and the second bottom 522A have the same thickness dimension.

The third groove 524 and the second connection portion 525 are respectively provided at positions which are rotationally symmetrical to the first groove 520 and the first connection portion 523 with respect to the plane central point O in the filter plan view. In addition, the third groove 524 is not provided at a position overlapping the protrusion 513, but has the same configuration as the first groove 520 except for the fact. Further, the second connection portion 525 has the same configuration as the first connection portion 523 except for connecting a third bottom 524A which is a groove bottom of the third groove 524 to the second bottom 522A.

The movable portion 521 is formed in a larger thickness dimension than that of the second bottom 522A, and is formed in the same dimension as, for example, a thickness dimension of the movable substrate 52 (the substrate outer circumferential portion 528) in the present embodiment. The movable portion 521 is formed in a larger diameter dimension than at least a diameter dimension of an outer circumferential edge of the reflective film installation surface 512A in the filter plan view. In addition, the movable portion 521 is provided with a movable electrode 562 and the movable reflective film 55 forming the electrostatic actuator 56. The movable electrode 562 and the movable reflective film 55 may be directly provided on a movable surface 521A, and may be provided on another thin film (layer) which is provided on the movable surface 521A.

In the same manner as in the fixed substrate 51, an antireflective film may be provided on a surface of the movable portion 521 on an opposite side to the fixed substrate 51.

The movable electrode 562 is formed in an annular shape centering on the plane central point O. In addition, a movable extraction electrode 562A corresponding to a second electrode according to the invention is connected to the movable electrode 562. A material for forming the movable electrode 562 and the movable extraction electrode 562A may include, for example, ITO, or the like. An insulating film may be formed on a surface of the movable electrode 562.

The movable extraction electrode 562A is extracted up to the first bottom 520A along a region opposing the electrode extraction groove 511B1 and the first connection portion 523. The movable extraction electrode 562A is in contact with the movable connection electrode 562B which is formed on the front end surface 513A of the protrusion 513, at a position overlapping the protrusion 513 in the filter plan view, and is thus electrically connected thereto. In other words, in the wavelength variable interference filter 5, the position overlapping the front end surface 513A of the protrusion 513 is a connection position according to the invention. Here, when the movable extraction electrode 562A and the movable connection electrode 562B come into contact with each other, the flexible first bottom. 520A is elastically deformed so as to absorb a pressing force caused by the contact between the electrodes. Accordingly, it is possible to minimize tilting of the movable substrate 52. In addition, a pressing force is generated between the first bottom 520A and the protrusion 513 by an elastic force due to the elastic deformation of the first bottom 520A. The movable extraction electrode 562A and the movable connection electrode 562B are biased in a direction of being close to each other by the pressing force, and come into contact with each other by predetermined contact pressure so as to be maintained in the electrical connection state.

In the present embodiment, as illustrated in FIG. 2, the electrostatic actuator 56 is formed by the region where the fixed electrode 561 overlaps the movable electrode 562. Accordingly, since the electrostatic actuator 56 can generate an electrostatic attraction in a region which is in point symmetry with respect to the plane central point O, it is possible to minimize tilting of the movable portion 521 and thus to displace the movable portion 521 to the fixed substrate 51 side with good balance.

The movable reflective film 55 is provided at a central part of the movable surface 521A of the movable portion 521 so as to face the fixed reflective film 54 with the gap G1. The above-described reflective film having the same configuration as that of the fixed reflective film 54 is used as the movable reflective film 55.

In addition, in the present embodiment, an example is described in which a gap G2 between the electrodes 561 and 562 is larger than the gap G1 between the reflective films 54 and 55, but the invention is not limited thereto. For example, a configuration may be used in which the gap G1 is larger than the gap G2 depending on a wavelength region of measurement target light in a case or the like where infrared rays or far infrared rays are used as the measurement target light.

The movable portion 521 is held on the second bottom 522A as a diaphragm as described above. The second bottom 522A is more easily deflected than the movable portion 521, and can displace the movable portion 521 to the fixed substrate 51 side with a slight electrostatic attraction. At this time, since the movable portion 521 has a larger thickness dimension than that of the second bottom 522A, and has an increasing rigidity, it is possible to minimize changing in a shape of the movable portion 521 to an extent even in a case where the movable portion 521 is pulled to the fixed substrate 51 side by an electrostatic attraction.

In addition, in the present embodiment, a configuration is exemplified in which the movable portion 521 is held by the second bottom 522A with a diaphragm shape, but, the invention is not limited thereto, and, for example, the second bottom 522A may have a beam shape so as to be disposed at the same angle intervals centering on the plane central point O of the movable portion 521.

The movable substrate 52 having the above-described configuration is provided with notches 527 so as to correspond to the vertexes C1 and C2 of the fixed substrate 51, and the fixed electrode pad 561P and the movable electrode pad 562P are exposed to surfaces in which the wavelength variable interference filter 5 is viewed from the movable substrate 52 side. The electrode pads 561P and 562P are connected to the voltage control unit 15.

Configurations of Detector, I-V Converter, Amplifier, and A/D Converter of Optical Module Next, referring to FIG. 1 again, the optical module 10 will be described.

The detector 11 receives (detects) light which has passed through the wavelength variable interference filter 5, and outputs a detection signal based on a reception amount to the I-V converter 12.

The I-V converter 12 converts the detection signal input from the detector 11 into a voltage value which is output to the amplifier 13.

The amplifier 13 amplifies the voltage (detection voltage) corresponding to the detection signal, input from the I-V converter 12.

The A/D converter 14 converts the detection voltage (analog signal) input from the amplifier 13 into a digital signal which is output to the controller 20.

Configuration of Voltage Control Unit

The voltage control unit 15 applies a driving voltage to the electrostatic actuator 56 of the wavelength variable interference filter 5 under the control of the controller 20. Accordingly, an electrostatic attraction is generated between the fixed electrode 561 and the movable electrode 562 of the electrostatic actuator 56, and thus the movable portion 521 is displaced to the fixed substrate 51 side.

Configuration of Controller

Next, the controller 20 of the spectrometry apparatus 1 will be described.

The controller 20 is formed, for example, by combining a CPU, a memory, and the like together, and controls an entire operation of the spectrometry apparatus 1. As illustrated in FIG. 1, the controller 20 includes a wavelength setting unit 21, a light amount acquisition unit 22, and a spectrometry unit 23. In addition, the memory of the controller 20 stores V-λ data indicating a relationship between a wavelength of light which is transmitted through the wavelength variable interference filter 5 and a driving voltage applied to the electrostatic actuator 56 so as to correspond to the wavelength.

The wavelength setting unit 21 sets an aimed wavelength of light which is extracted by the wavelength variable interference filter 5, and outputs a command signal for applying a driving voltage corresponding to the set aimed wavelength to the electrostatic actuator 56 on the basis of V-λ data, to the voltage control unit 15.

The light amount acquisition unit 22 acquires an amount of light of the aimed wavelength which has been transmitted through the wavelength variable interference filter 5 on the basis of a light amount acquired by the detector 11.

The spectrometry unit 23 measures spectral characteristics of the measurement target light on the basis of the light amount acquired by the light amount acquisition unit 22.

Manufacturing Method of Wavelength Variable Interference Filter

Next, a manufacturing method of the wavelength variable interference filter 5 will be described with reference to FIGS. 4A to 5F.

In order to manufacture the wavelength variable interference filter 5, the fixed substrate 51 and the movable substrate 52 are manufactured separately from each other, and then the manufactured fixed substrate 51 and movable substrate 52 are joined to each other.

Fixed Substrate Manufacturing Steps

Figure 4A:
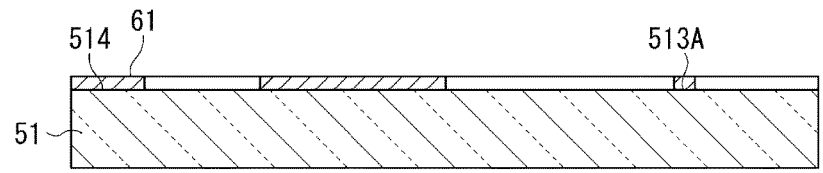
FIGS. 4A to 4E are diagrams illustrating schematic manufacturing steps of a fixed substrate according to the embodiment.

First, a quartz glass substrate which is a material for manufacturing the fixed substrate 51 and has a thickness dimension of, for example, 500 μm, is prepared, and both sides thereof are finely polished until a surface roughness Ra of the quartz glass substrate becomes 1 nm or less. In addition, a resist 61 for forming the electrode arrangement groove 511 is coated on a surface of the fixed substrate 51 facing the movable substrate 52, and the coated resist 61 is exposed and developed in a photolithographic method, so as to pattern locations at which the electrode arrangement groove 511, the electrode extraction grooves 511B, and the electrode connection portion 511C will be formed, as illustrated in FIG. 4A. A mask is formed only at a position corresponding to the protrusion 513 in the electrode extraction groove 511B1.

Figure 4B:
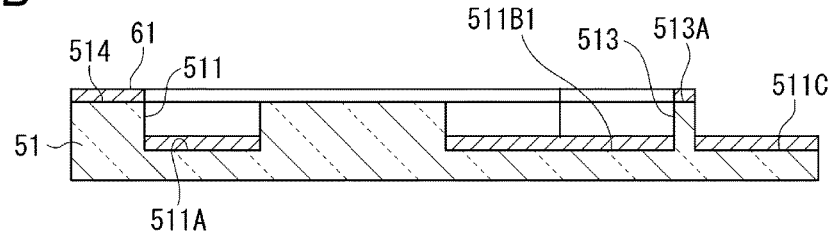

Next, as illustrated in FIG. 4B, the electrode arrangement groove 511, the electrode extraction grooves 511B, and the electrode connection portion 511C are etched in a desired depth. In addition, the etching here employs wet etching using an etchant such as HF.

In addition, the resist 61 for forming the reflective film installation surface 512A is coated on the surface of the fixed substrate 51 facing the movable substrate 52; the coated resist 61 is exposed and developed in a photolithographic method; and, as illustrated in FIG. 4B, a location at which the reflective film installation surface 512A will be formed is patterned.

Figure 4C:
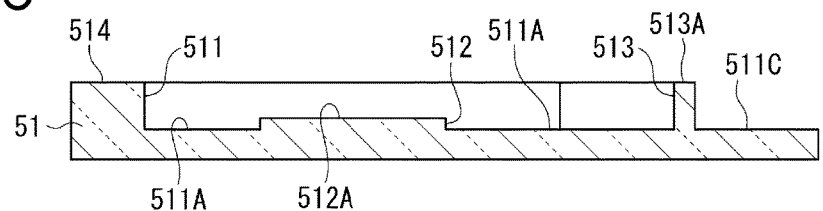

Next, after the reflective film installation surface 512A is etched up to a desired position, as illustrated in FIG. 4C, the resist 61 is removed. Therefore, the electrode installation surface 511A, the reflective film installation surface 512A, the electrode extraction grooves 511B, the electrode connection portion 511C, and the first joining surface 514 are formed, and a substrate shape of the fixed substrate 51 is determined.

Figure 4D:
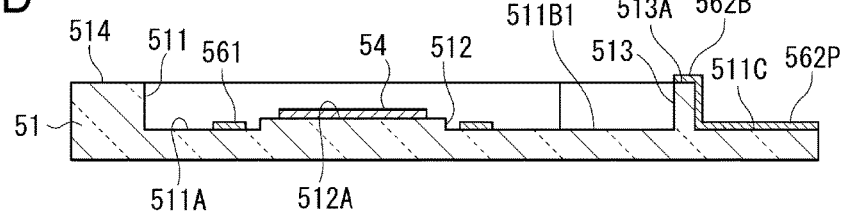

Next, as illustrated in FIG. 4D, the fixed electrode 561 is formed on the electrode installation surface 511A. In addition, although not illustrated, the fixed extraction electrode 561A is formed from the fixed electrode 561 to the electrode connection portion 511C located at the vertex C2. Further, the movable connection electrode 562B is formed from the front end surface 513A of the protrusion 513 to the electrode connection portion 511C located at the vertex C1. Furthermore, the fixed reflective film 54 is formed on the reflective film installation surface 512A.

For example, when the fixed electrode 561, the fixed extraction electrode 561A, and the movable connection electrode 562B are formed, an Au/Cr laminate film is formed on the fixed substrate 51 in a sputtering method, a resist which gives a desired electrode pattern is formed on the Au/Cr laminate film, and the Au/Cr laminate film is photo-etched. In this way, the movable connection electrode 562B with a thickness dimension D1 is formed.

In addition, the fixed reflective film 54 is formed by using a lift-off process. In other words, a resist (a lift-off pattern) is formed at parts other than a part where a mirror is formed on the fixed substrate 51, in a photolithographic method, and a $TiO_2$—$SiO_2$ based thin film is formed in a sputtering method or a deposition method. In addition, after the fixed reflective film 54 is formed, thin films other than the reflective film installation surface 512A are removed by using lift-off.

Figure 4E:
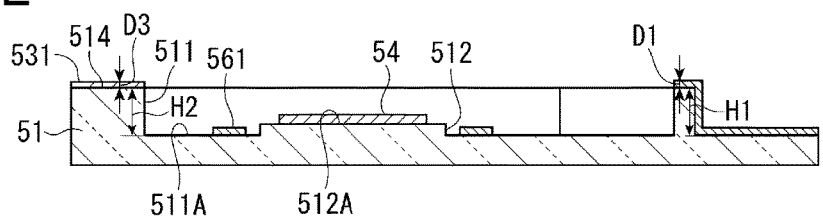

Next, the resist 61 (a lift-off pattern) is formed at parts other than a part where a first joining film 531 is formed on the fixed substrate 51, in a photolithographic method, and a plasma polymerization film in which polyorganosiloxane with a thickness dimension D3 is used is formed in a plasma CVD method. In addition, the resist 61 is removed, and thus the first joining film 531 is formed on the first joining surface 514 as illustrated in FIG. 4E.

Due to the above-described steps, the fixed substrate 51 is formed.

Movable Substrate Manufacturing Steps

First, a quartz glass substrate which is a material for manufacturing the movable substrate 52 and has a thickness dimension of, for example, 500 μm, is prepared, and both sides thereof are finely polished until a surface roughness Ra of the quartz glass substrate becomes 1 nm or less. In addition, a resist 62 is coated on the entire surface of the movable substrate 52, and the coated resist 62 is exposed and developed in a photolithographic method, so as to form a mask pattern having openings where the resist 62 is removed in regions respectively corresponding to the first groove 520, the second groove 522, the first connection portion 523, the third groove 524, and the second connection portion 525, as illustrated in FIG. 5A.

Figure 5A:
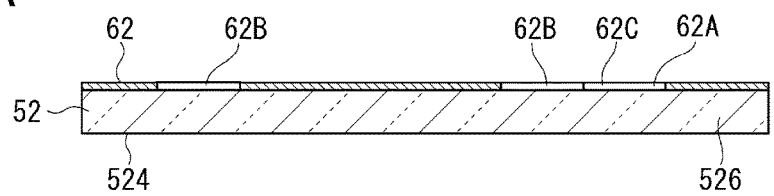
FIGS. 5A to 5F are diagrams illustrating schematic manufacturing steps of a movable substrate according to the embodiment.

The resist 62 has the first opening 62A, the second opening 62B, and the third opening 62C which respectively correspond to the first bottom 520A, the second bottom 522A, and the first connection portion 523, as illustrated in FIG. 5A. The first opening 62A and the second opening 62B are connected to each other via the third opening 62C.

In addition, although not illustrated, the resist 62 has a fourth opening and a fifth opening which respectively correspond to the third bottom 524A and the second connection portion 525, as openings. The fourth opening and the fifth opening respectively have the same shapes as those of the second opening 62B and the third opening 62C. In addition, the fourth opening is provided at a position which is rotationally symmetrical to the second opening 62B, and the fifth opening is provided at a position which is rotationally symmetrical to the third opening 62C.

Figure 5B:
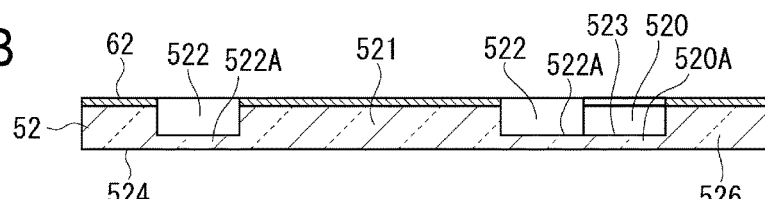

Next, the quartz glass substrate is wet-etched, and, thus, as illustrated in FIG. 5B, the second bottom 522A, the first connection portion 523, the third bottom 524A, and the second connection portion 525 with a thickness of 50 μm are formed, and the movable portion 521 is also formed. More specifically, if the wet etching starts, recesses are respectively formed in the regions of the quartz glass substrate where the openings (the first opening 62A, the second opening 62B, the third opening 62C, the fourth opening, and the fifth opening) are formed in the resist 62. At this time, since the first opening 62A, the second opening 62B, and the third opening 62C are connected to each other, an etchant is circulated among the openings 62A, 62B and 62C. Accordingly, a problem such as the etchant remaining only at the first opening 62A does not occur, and, in the respective regions where the openings (the first opening 62A, the second opening 62B, the third opening 62C, the fourth opening, and the fifth opening) are formed, the etching progresses at the same rate, and grooves with the same depth are formed.

Figure 5C:
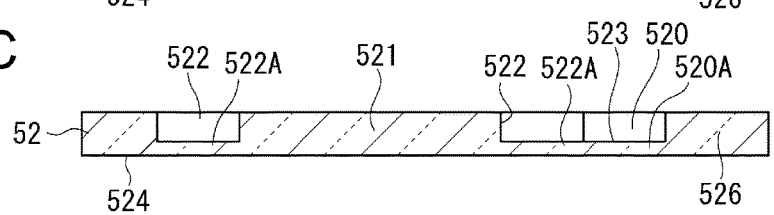

Subsequently, as illustrated in FIG. 5C, the resist 62 is removed, and thus a substrate shape of the movable substrate 52 provided with the movable portion 521 and the second bottom 522A is determined.

Figure 5D:
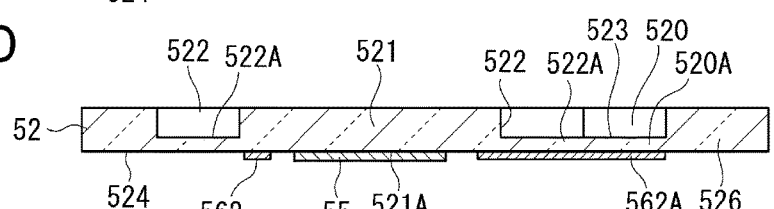

Next, as illustrated in FIG. 5D, the movable electrode 562 is formed on the surface of the second bottom 522A facing the fixed substrate 51, and the movable extraction electrode 562A which extends from a part of the outer circumferential edge of the movable electrode 562 toward the vertex C1 is formed. In addition, the movable reflective film 55 is formed on the movable surface 521A.

Specifically, an Au/Cr laminate film is formed on the surface of the movable substrate 52 facing the fixed substrate 51 in a sputtering method or the like. In addition, a resist which gives a desired electrode pattern is formed on the Au/Cr laminate film, and the Au/Cr laminate film is photo-etched. Thus, as illustrated in FIG. 5D, the movable electrode 562 and the movable extraction electrode 562A with a thickness dimension D2 are formed. Next, the resist remaining on the surface of the movable substrate 52 facing the fixed substrate 51 is removed.

In addition, the movable reflective film 55 is formed by using a lift-off process. In other words, a resist (a lift-off pattern) is formed at parts other than a part where a mirror is formed on the movable substrate 52, in a photolithographic method, and a $TiO_2$—$SiO_2$ based thin film is formed in a sputtering method or a deposition method. In addition, after the movable reflective film. 55 is formed, thin films other than the movable surface 521A are removed by using lift-off.

Figure 5E:
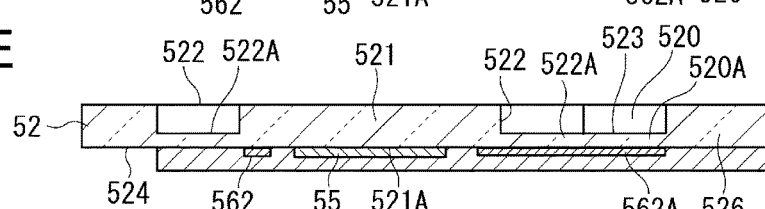
Figure 5F:
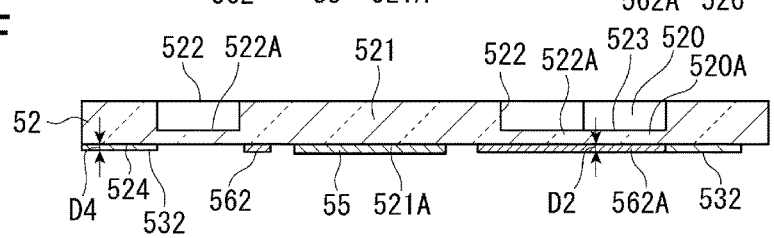

Next, as illustrated in FIG. 5E, the resist 62 (a lift-off pattern) is formed at parts other than a part where a second joining film 532 is formed on the movable substrate 52, in a photolithographic method, and a plasma polymerization film in which polyorganosiloxane with a thickness dimension D4 is used is formed in a plasma CVD method. In addition, the resist 62 is removed, and thus the second joining film 532 is formed on the second joining surface 526 as illustrated in FIG. 5F.

Due to the above-described steps, the movable substrate 52 is formed.

Joining Steps

Next, the respective substrates 51 and 52 which are formed in the above-described fixed substrate manufacturing steps and movable substrate manufacturing steps are joined to each other. Specifically, an $O_2$ plasma treatment or a UV treatment is performed in order to give activation energy to the plasma polymerization films forming the joining films 53 which are formed on the respectively joining surfaces 514 and 526 of the substrates 51 and 52. The $O_2$ plasma treatment is performed for thirty seconds in conditions of an $O_2$ flow rate of 30 cc/min, a pressure of 27 Pa, and an RF power of 200 W. In addition, the UV treatment is performed for three minutes by using excimer UV (wavelength of 172 nm) as a UV light source. After the activation energy is given to the plasma polymerization films, the two substrates 51 and 52 are aligned so that the protrusion 513 of the fixed substrate 51 overlaps the first bottom 520A of the movable substrate 52 in the filter plan view. In addition, the joining surfaces 514 and 526 are made to overlap each other via the joining films 531 and 532, and the substrates 51 and 52 are joined to each other by applying a load to the joining part.

Here, in the present embodiment, a sum of the dimension D1 of the movable connection electrode 562B, the dimension D2 of the movable extraction electrode 562A, and the dimension H1 of the protrusion 513 in the thickness direction of the substrate is formed to be larger than a sum of the thickness dimension D3 of the first joining film 531, the thickness dimension D4 of the second joining film 532, and the dimension H2 from the bottom surfaces of the electrode extraction grooves 511B1 and 511B2 to the first joining surface 514.

In addition, in a joining state of the substrates 51 and 52 in which the first joining film 531 is joined to the second joining film 532, the first bottom 520A is pressed by the front end surface 513A of the protrusion 513 via the movable extraction electrode 562A and the movable connection electrode 562B so as to be elastically deformed. Accordingly, the substrates 51 and 52 are joined to each other without the movable substrate 52 being tilted with respect to the fixed substrate 51. In addition, the movable extraction electrode 562A and the movable connection electrode 562B are brought into pressing contact with each other by an elastic force from the first bottom 520A which is elastically deformed, and are thus electrically connected to each other.

As mentioned above, the wavelength variable interference filter 5 is manufactured.

Operations and Effects of First Embodiment

In the present embodiment, on the movable substrate 52, the first groove 520 is provided at least at the connection position overlapping the protrusion 513 in the filter plan view. In addition, the movable extraction electrode 562A and the movable connection electrode 562B come into pressing contact with each other for electrical connection between the first bottom 520A of the first groove 520 and the protrusion 513. At this time, the first bottom 520A is deflected, and thus a stress when the movable extraction electrode 562A and the movable connection electrode 562B come into pressing contact with each other can be released, thereby minimizing deflection or tilting of the movable substrate 52. Therefore, it is possible to provide the wavelength variable interference filter 5 having a high spectral performance.

In addition, when the movable extraction electrode 562A and the movable connection electrode 562B come into contact with each other, electrical connection between the movable extraction electrode 562A and the movable connection electrode 562B is maintained by an elastic force of the deformed first bottom 520A.

Here, on the second substrate, the first groove 520 and the second groove 522 are connected to each other, and an area of the second groove 522 in the filter plan view is larger than that of the first groove 520. The first groove 520 and the second groove 522 can be simultaneously formed through wet etching. Specifically, as described above, the resist 62 having the openings 62A and 62B corresponding to the first groove 520 and the second groove 522 is formed, and wet etching is performed. The openings 62A and 62B are connected to each other. Accordingly, the first groove 520 and the second groove 522 are connected to each other so that an etchant flows into the first groove 520 from the second groove 522, and circulation of the etchant is promoted so that etching in the first groove 520 fully progresses. Therefore, it is possible to make a thickness of the first bottom 520A small enough. Thus, as described above, when the movable extraction electrode 562A and the movable connection electrode 562B come into contact with each other, it is possible to minimize deflection or tilting of the movable substrate 52, and to form the first groove 520 with a thickness dimension which allows a contact pressure due to an elastic force to be sufficiently secured.

In addition, the second groove 522 which holds the movable portion 521 and functions as a diaphragm, and the first groove 520 can be simultaneously formed. Accordingly, it is possible to reduce the number of manufacturing steps of the wavelength variable interference filter 5, and thus to minimize manufacturing costs.

In the present embodiment, the first connection portion 523 which connects the first bottom 520A to the second bottom 522A is provided, and thus it is possible to form a groove in which the first bottom 520A, the second bottom 522A, and the first connection portion 523 are coplanar with each other, through wet etching.

In this case, the resist 62 having the openings 62A, 62B and 62C which respectively correspond to the first bottom 520A, the second bottom 522A, and the first connection portion 523 connecting the two bottoms to each other, is formed, and then wet etching is performed. Accordingly, the first bottom 520A, the second bottom 522A, and the first connection portion 523 are etched at the same rate, and thus the first groove 520 and the second groove 522 become grooves having the same depth. Therefore, it is possible to sufficiently secure a groove depth of the first groove 520 and thus to sufficiently ensure flexibility of the first bottom 520A.

In addition, in the present embodiment, the first connection portion 523 is provided, and thus the first groove 520 and the second groove 522 can be provided at positions which are separated from each other. Accordingly, it is possible to more reliably minimize an influence of a stress occurring when the first bottom 520A is deformed, on the second bottom 522A which functions as the holding portion. Therefore, it is possible to minimize a fluctuation in a gap dimension, a reduction in control accuracy of the gap dimension, or the like due to the application of the stress to the second bottom 522A, and thus to provide the wavelength variable interference filter 5 which controls the gap dimension with high accuracy.

In the present embodiment, the first connection portion 523 is provided along the virtual straight line L which connects the first groove 520 to the second groove 522 in the shortest distance. Accordingly, it is possible to connect the first groove 520 to the second groove 522 in the shortest distance, and thus to reduce an area of the first connection portion 523 in the filter plan view. Therefore, it is possible to minimize a reduction in a rigidity of the movable substrate 52 due to the first connection portion 523 being provided and thus to minimize deflection of the movable substrate 52 due to the rigidity reduction.

In the present embodiment, the second groove 522 is provided with the second bottom 522A which functions as a diaphragm, and has an annular shape, that is, a rotationally symmetrical shape in the filter plan view. In addition, the third groove 524 and the second connection portion 525 are provided at positions which are rotationally symmetrical to the first groove 520 and the first connection portion 523 with respect to the plane central point O which is a symmetrical center. Accordingly, it is possible to minimize bias of a stress of the movable substrate 52 due to the first groove 520 being provided. Therefore, it is possible to minimize a reduction in control accuracy of a gap dimension due to the bias of a stress, and thus to provide a wavelength variable interference filter having a high spectral performance.

Second Embodiment

Next, a second embodiment according to the present invention will be described with reference to the drawings.

The present embodiment is different from the first embodiment in that a width of a connection portion in the filter plan view is smaller than a width of a first groove.

Figure 6:
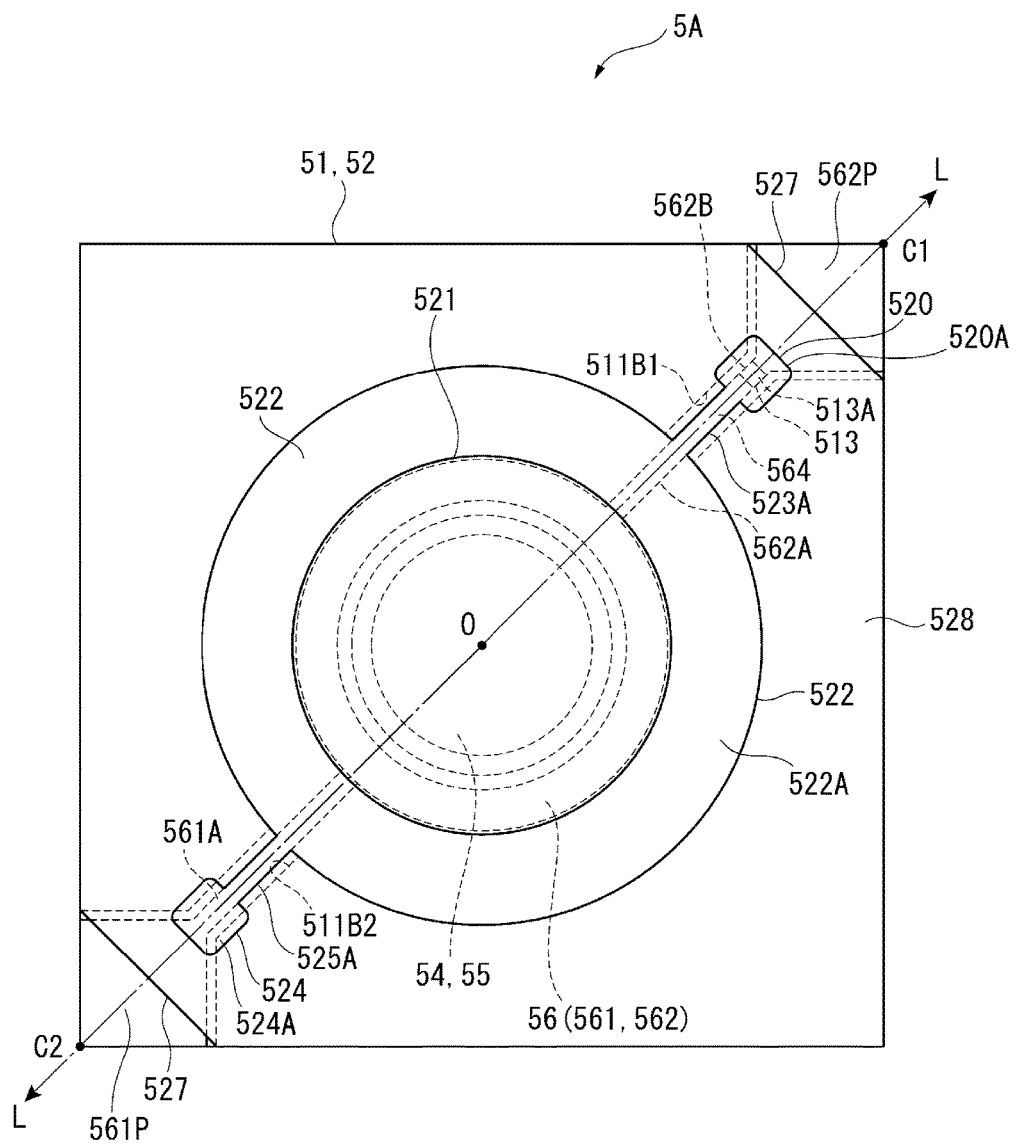
FIG. 6 is a plan view illustrating a schematic configuration of a wavelength variable interference filter according to a second embodiment.

FIG. 6 is a plan view illustrating a schematic configuration of a wavelength variable interference filter 5A of the second embodiment according to the invention. In addition, in the following description, constituent elements which have been already described are given the same reference numerals, and description thereof will not be repeated or will be made briefly.

In the present embodiment, as illustrated in FIG. 6, a first connection portion 523A connects the first groove 520 to the second groove 522 in the shortest distance in the filter plan view in the same manner as in the first embodiment. The first connection portion 523A is provided along the virtual straight line L which passes through the plane central point O and the vertexes C1 and C2. The first connection portion 523A has a smaller dimension (hereinafter, referred to as a width dimension) in a direction (width direction) perpendicular to the virtual straight line L than a width dimension of the first groove 520 in the filter plan view.

A width dimension of the first connection portion 523A is preferably in a range in which an etchant is sufficiently circulated between the first groove 520 and the second groove 522 when the movable substrate 52 is manufactured, and thus the first bottom 520A of the first groove 520 can be thinned up to a thickness which causes elastic deformation. In other words, a width dimension of the first connection portion 523A can be set to be as small as possible in a range of being capable of achieving the purpose.

In addition, the third bottom 524A and a second connection portion 525A corresponding to the first bottom 520A and the first connection portion 523A are formed.

Operations and Effects of Second Embodiment

In the present embodiment, the following effects can be additionally achieved along with the effects of the first embodiment. In other words, a width dimension of the first connection portion 523A is smaller than a width dimension of the first groove 520, and thus it is possible to further reduce an area of the first connection portion 523A in the filter plan view. Therefore, it is possible to further minimize a reduction in a rigidity of the movable substrate 52 due to the first connection portion 523A being provided and thus to further minimize deflection of the movable substrate 52 due to the rigidity reduction.

Third Embodiment

Next, a third embodiment according to the invention will be described with reference to the drawings.

The first connection portion of the second embodiment is provided along the virtual straight line L so that the first groove 520 is connected to the second groove 522 in the shortest distance in the filter plan view. In contrast, a first connection portion of the present embodiment is different from the first connection portion of the second embodiment in that the first connection portion has a bent shape in the filter plan view.

Figure 7:
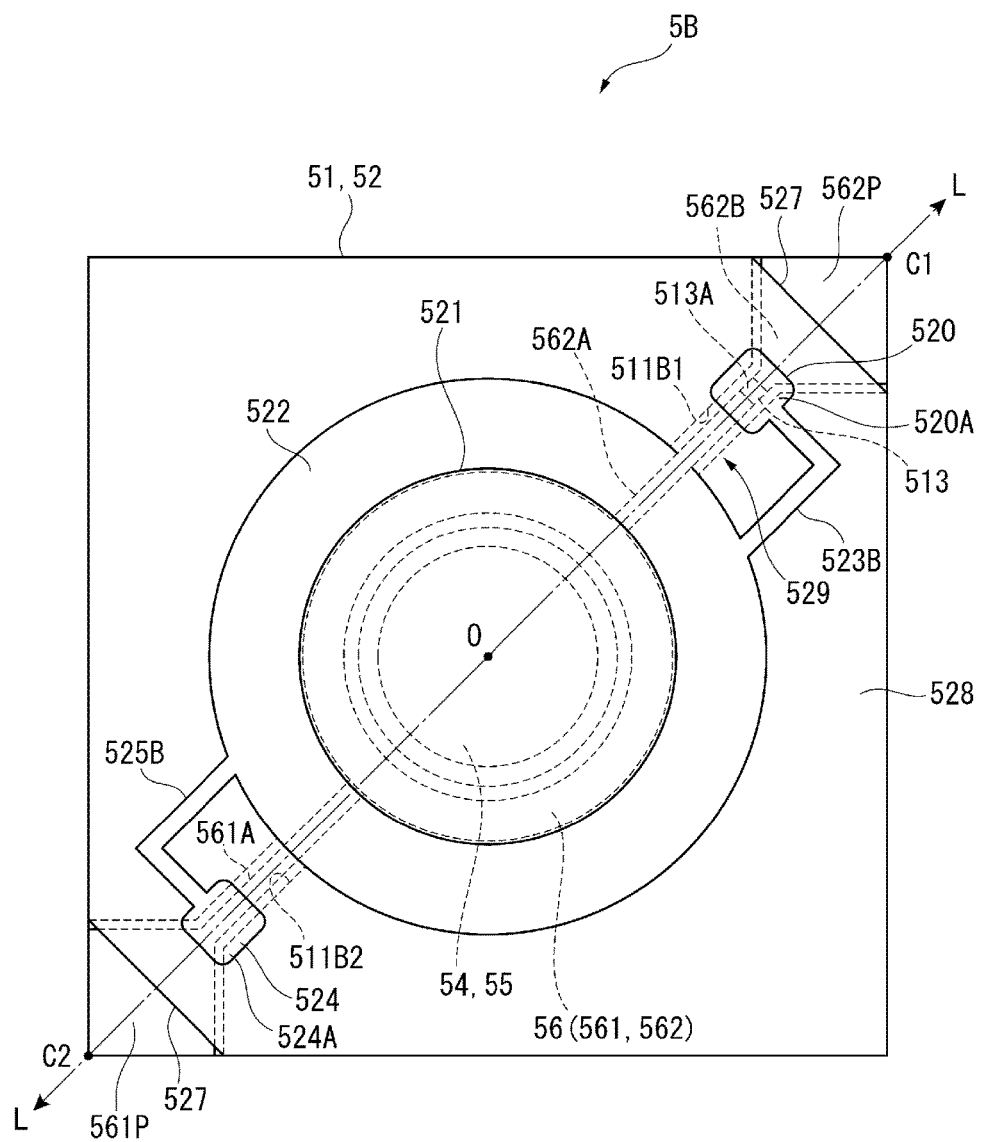
FIG. 7 is a plan view illustrating a schematic configuration of a wavelength variable interference filter according to a third embodiment.

FIG. 7 is a plan view illustrating a schematic configuration of a wavelength variable interference filter 5B of the third embodiment according to the invention.

In the present embodiment, as illustrated in FIG. 7, the movable substrate 52 is provided with a thick portion 529 which has the same thickness as that of the substrate outer circumferential portion 528 of the movable substrate 52 on the virtual straight line L which connects the first groove 520 to the second groove 522 in the shortest distance. A first connection portion 523B goes around the thick portion 529 and connects the first groove 520 to the second groove 522. Specifically, the first connection portion 523B extends from the first groove 520 in a direction of intersecting the virtual straight line L and is then bent toward the second groove 522 in the filter plan view.

In addition, also in the present embodiment, a width dimension of the first connection portion 523B in a direction perpendicular to the extending direction of the first connection portion 523B in the filter plan view is not particularly limited. In the same manner as in the second embodiment, a width dimension of the first connection portion 523B can be set to be as small as possible in a range in which the first bottom 520A of the first groove 520 can be thinned up to a thickness which causes elastic deformation through etching.

In addition, the third groove 524 and a second connection portion 525B corresponding to the first groove 520 and the first connection portion 523B are formed.

Operations and Effects of Third Embodiment

In the present embodiment, the following effects can be additionally achieved along with the effects of the first and second embodiments. In other words, the first groove 520 and the second groove 522 which are provided separately from each other are connected to each other via the bent first connection portion 523. Accordingly, the thick portion 529 having a large thickness can be provided between the first groove 520 and the second groove 522. The thick portion is provided, and thus it is possible to prevent a stress occurring when the first bottom 520A is deformed, from being applied to the second bottom 522A. Therefore, it is possible to minimize a fluctuation in a gap dimension, a reduction in control accuracy of the gap dimension, or the like due to the application of the stress to the second bottom 522A, and thus to provide a wavelength variable interference filter which has a high resolution.

Fourth Embodiment

Next, a fourth embodiment according to the invention will be described with reference to the drawings.

In the fourth embodiment, the first groove is directly connected to the second groove without using a connection portion.

Figure 8:
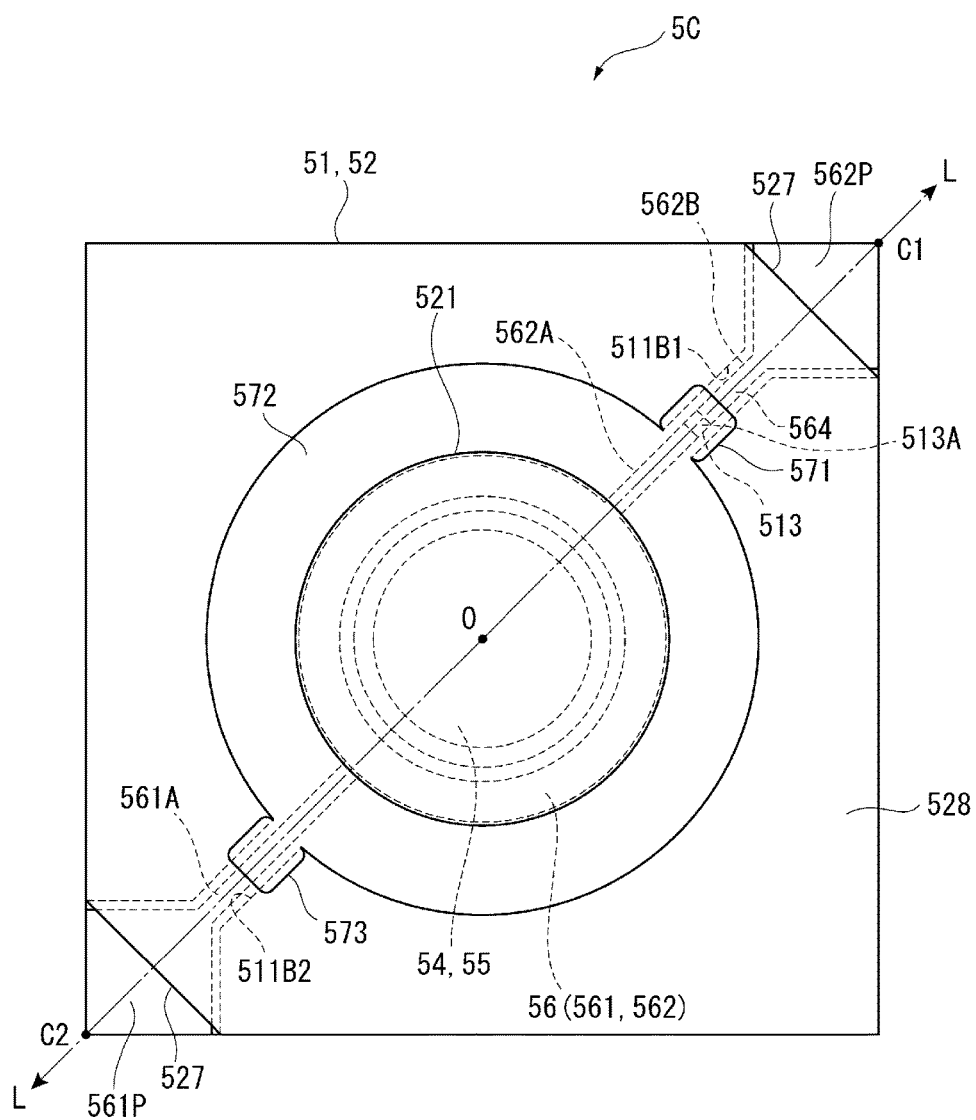
FIG. 8 is a plan view illustrating a schematic configuration of a wavelength variable interference filter according to a fourth embodiment.
Figure 9:
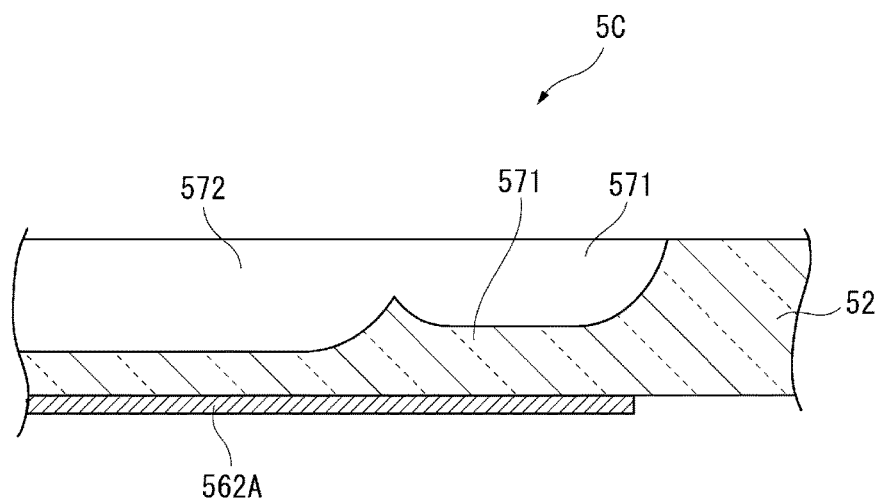
FIG. 9 is a cross-sectional view illustrating a schematic configuration of the wavelength variable interference filter according to the fourth embodiment.

FIG. 8 is a plan view illustrating a schematic configuration of a wavelength variable interference filter 5C of the fourth embodiment according to the invention. In addition, FIG. 9 is a cross-sectional view illustrating a schematic configuration of the enlarged vicinity of a first groove of the wavelength variable interference filter illustrated in FIG. 8.

In the present embodiment, as illustrated in FIG. 8, a first groove 571 and a second groove 572 share a part of the outer edges thereof and are thus directly connected to each other. Specifically, the first groove 571 is provided on the virtual straight line L. In addition, the first groove 571 and the second groove 572 have no sidewalls at a position which the virtual straight line L overlaps, and are thus connected to each other (refer to FIG. 9). At the connection position, the outer edges of the first groove 571 and the second groove 572 are connected to each other.

Also in the present embodiment, in the same manner as in each of the above-described embodiments, the protrusion 513 is provided at a position overlapping the first groove 571 in the filter plan view.

In addition, a third groove 573 corresponding to the first groove 571 is formed.

In a case where the first groove 571, the second groove 572, and the third groove 573 are formed through wet etching, first, a resist having openings corresponding to the first groove 571, the second groove 572, and the third groove 573 is formed, and then wet etching is performed thereon. Etching of the first groove 571 (the third groove 573) having the smaller area than that of the second groove 572 is difficult to progress until the wet etching progresses, and the first groove 571 and the second groove 572 (the third groove 573 and the second groove 572) are connected to each other through side etching. However, if the etching progresses, and the side etching progresses, so that the first groove 571 (the third groove 573) is connected to the second groove 572, circulation of an etchant between the first groove 571 (the third groove 573) and the second groove 572 is promoted. Accordingly, thereafter, the etching progresses at the same rate in the first groove 571, the second groove 572, and the third groove 573.

Operations and Effects of Fourth Embodiment

In the present embodiment, the first groove 571 and the second groove 572 are adjacent and are directly connected to each other. Accordingly, since a groove or the like for connecting the first groove 571 to the second groove 572 is not provided separately, it is possible to minimize a reduction in a rigidity of the movable substrate 52 due to the groove. Therefore, it is possible to provide a wavelength variable interference filter having high spectral accuracy.

Modification Example of Fourth Embodiment

In the fourth embodiment, the mask pattern having openings corresponding to the first groove 571 and the second groove 572 are formed on the substrate, and then wet etching is performed. At this time, a mask pattern including openings which do not communicate with each other in the filter plan view so as to correspond to the actually formed first groove 571 and second groove 572 may be formed in consideration of aside edge. In this case, the mask pattern is formed in which the openings are provided separately from each other so as to correspond to the first groove 571 and the second groove 572. Therefore, when etching starts, the first groove 571 and the second groove 572 are formed separately from each other, and an etchant is not circuited between the two grooves 571 and 572 until the first groove 571 and the second groove 572 are connected to each other through side etching. For this reason, a difference occurs in an etching progress rate, and thus there is a concern that a finally formed first bottom 571A of the first groove 571 may not be sufficiently thin, and the first bottom 571A may not be deformed in the substrate thickness direction.

Figure 10:
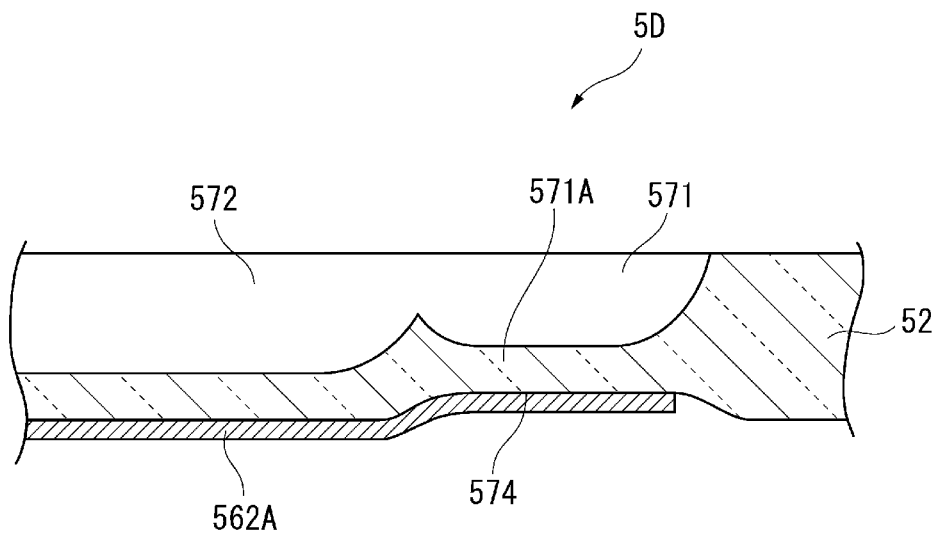
FIG. 10 is a cross-sectional view illustrating a schematic configuration of a wavelength variable interference filter according to a modification example of the embodiment.

FIG. 10 is an enlarged cross-sectional view illustrating a schematic configuration of the vicinity of a first groove 571 of a wavelength variable interference filter 5D in the present modification example.

In the present modification example, as illustrated in FIG. 10, the movable substrate 52 is provided with a fourth groove 574 which is formed in a region which overlaps the first groove 571 and does not overlap the second groove 572 on the surface facing the fixed substrate 51 in the filter plan view. In addition, the fourth groove 574 is also similarly formed in a region which overlaps the third groove 573 and does not overlap the second groove 572.

The fourth groove 574 can be formed along with the first groove 571 and the second groove 572 through wet etching. For example, a mask, which has openings at positions overlapping openings of a mask corresponding to the first groove 571 and the third groove 573, is formed on an opposite side to a side where the first groove 571 and the like are formed, and an etching process is performed from both of the sides of the substrate. Accordingly, as described above, the first groove 571, the second groove 572, and the third groove 573 are formed from one surface of the substrate, and the fourth groove 574 is also formed from the other surface of the substrate. At this time, the fourth groove 574 is not connected to the second groove 572, and thus is not connected to other grooves even if side etching progresses. For this reason, an etchant remaining occurs in the fourth groove 574, and thus an etching progress rate therein is lower than that in the first groove 571. Therefore, a groove depth of the fourth groove 574 is smaller than that of the first groove 571.

In the present modification example, even if a groove depth of the first groove 571 is small, the fourth groove 574 is provided on the opposite side to the first groove 571, and thus it is possible to more reliably form the first bottom 571A with a thickness dimension which causes elastic deformation.

Fifth Embodiment

Next, a fifth embodiment according to the invention will be described with reference to the drawings.

In the spectrometry apparatus 1 of the first embodiment, the wavelength variable interference filter 5 is directly provided in the optical module 10. In contrast, an optical filter device may be used in which the wavelength variable interference filter is stored in a casing.

In the present embodiment, the optical filter device will be described.

Figure 11:
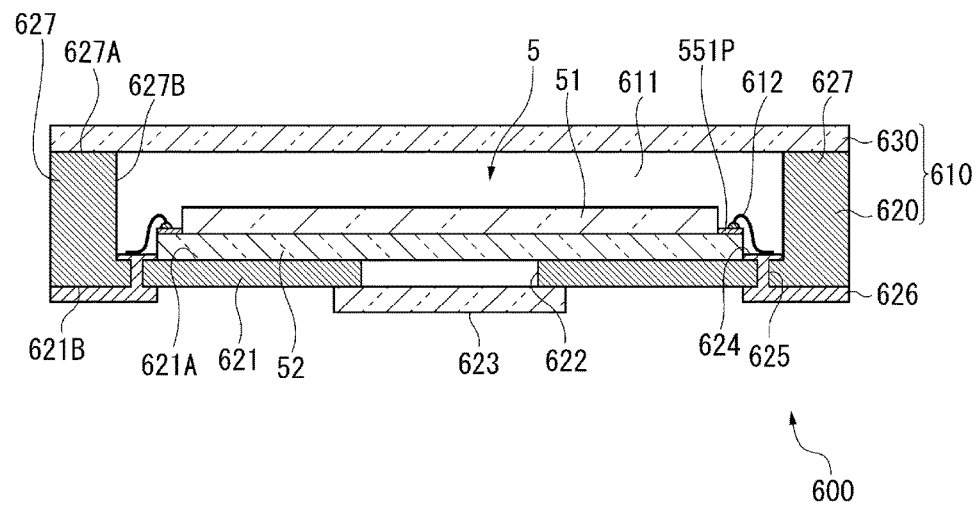
FIG. 11 is a cross-sectional view illustrating a schematic configuration of an optical filter device according to a fifth embodiment.

FIG. 11 is a cross-sectional view illustrating a schematic configuration of the optical filter device of the fifth embodiment according to the invention.

As illustrated in FIG. 11, the optical filter device 600 includes a casing 610 which stores the wavelength variable interference filter 5 therein. In addition, a wavelength variable interference filter is not limited to the wavelength variable interference filter 5 of the first embodiment, and may employ the wavelength variable interference filters 5A, 5B, 5C and 5D described in the other embodiments and the modification example.

Configuration of Casing

The casing 610 includes a base 620 and a lid 630 as illustrated in FIG. 11, and stores the wavelength variable interference filter 5 therein.

The base 620 is provided with a pedestal portion 621 and a sidewall portion 627.

The pedestal portion 621 is a plate-shaped portion having a rectangular exterior in the filter plan view. The wavelength variable interference filter 5 is placed on a base inner surface 621A of the pedestal portion 621 facing the lid 630. The pedestal portion 621 has a light exit hole 622 which penetrates therethrough in the thickness direction at the center thereof. An exit side glass window 623 is joined to the light exit hole 622.

In addition, internal terminal portions 624 which are connected to the electrode pads 561P and 562P of the wavelength variable interference filter 5 are provided on the base inner surface 621A. The internal terminal portions 624 and the electrode pads 561P and 562P are connected to each other via wires 612 such as Au, for example, by wire bonding. In addition, in the present embodiment, the wire bonding is exemplified, but, for example, a flexible printed circuit (FPC) or the like may be used.

The pedestal portion 621 is provided with through-holes 625 which are formed at the positions where the internal terminal portions 624 are provided. The internal terminal portions 624 are connected to external terminal portions 626 which are provided on a base outer surface 621B (a surface on an opposite side to the base inner surface 621A) of the pedestal portion 621, via the through-holes 625.

The sidewall portion 627 rises from the edge of the rectangular pedestal portion 621 and covers the periphery of the wavelength variable interference filter 5 placed on the base inner surface 621A. A surface (hereinafter, also referred to as an end surface 627A) of the sidewall portion 627 facing the lid 630 is formed as a planarized surface which is parallel to the base inner surface 621A.

The lid 630 has a rectangular exterior in the same manner as the pedestal portion 621 in the filter plan view, and is made of glass through which light can be transmitted. The lid 630 is joined to the end surface 627A in a state in which the wavelength variable interference filter 5 is placed on the base inner surface 621A. A space surrounded by an inner surface 627B of the sidewall portion 627, the base inner surface 621A, and the lid 630 is an inner space 611 of the casing 610, and is sealed when the lid 630 is joined.

In the optical filter device 600 configured in this way, light which is incident from the lid 630 side is incident to the wavelength variable interference filter 5. In addition, light spectrally diffracted by the wavelength variable interference filter 5 exits from the light exit hole 622.

In addition, in the present embodiment, a configuration of the wavelength variable interference filter 5 is exemplified in which the fixed substrate 51 side is disposed toward the base inner surface 621A, but the invention is not limited thereto and may employ a configuration in which the movable substrate 52 side is disposed toward the base inner surface 621A.

Operations and Effects of Fifth Embodiment

In the optical filter device 600 of the present embodiment, the wavelength variable interference filter 5 is protected by the casing 610, and thus it is possible to prevent breakage of the wavelength variable interference filter 5 due to external factors. Therefore, when the wavelength variable interference filter 5 is installed in an optical module of a colorimetry sensor or the like, and an electronic apparatus, or during maintenance, it is possible to prevent breakage due to collision with other members.

In addition, for example, in a case where the wavelength variable interference filter 5 manufactured in a factory is transported to an assembly line for assembling an optical module or an electronic apparatus, it is possible to safely transport the wavelength variable interference filter 5 protected by the optical filter device 600.

Further, since the optical filter device 600 is provided with the external terminal portions 626 which are exposed to the outer circumferential surface of the casing 610, it is possible to easily perform wiring even when incorporated into an optical module or an electronic apparatus.

Other Modification Examples

In addition, the invention is not limited to the above-described respective embodiments and modification example, and modifications, alterations, and the like in the scope in which the object of the invention can be achieved are included in the invention.

For example, in the respective embodiments and modification example, a configuration in which the protrusion 513 is integrally formed with the fixed substrate 51 has been exemplified, but the invention is not limited thereto, and the protrusion 513 may be provided separately from the fixed substrate 51. For example, the movable extraction electrode 562A and the movable connection electrode 562B may be electrically connected to each other by using a bump electrode which has at least a conductive surface.

In the above-described embodiments, a configuration in which the protrusion 513 is provided at the position corresponding to the first groove has been exemplified, but the invention is not limited thereto, and the movable extraction electrode 562A and the movable connection electrode 562B may be electrically connected to each other without providing the protrusion.

For example, a part of the joining surfaces 514 and 528 for joining the substrates 51 and 52 of the wavelength variable interference filter 5 may be used as a connection position. In this case, for example, the fixed extraction electrode 561A and the movable connection electrode 562B are provided instead of the joining film 53. A position where the fixed extraction electrode 561A and the movable connection electrode 562B overlap each other in the filter plan view may be a connection position, and the first groove may be provided at the position.

In addition, a sum of thicknesses of the fixed extraction electrode 561A and the movable connection electrode 562B is larger than a thickness of the joining film 53, and thus the fixed extraction electrode 561A and the movable connection electrode 562B are electrically connected to each other. Further, the first bottom is elastically deformed, and thus it is possible to prevent deflection or tilting of the substrate.

In the above-described respective embodiments and modification example, a sum of dimensions of the movable extraction electrode 562A, the movable connection electrode 562B, and the protrusion 513 in the substrate thickness direction is larger than a sum of thickness dimensions of the first joining film 531 and the second joining film 532 and a dimension from the bottom surface of the electrode extraction groove 511B1 to the first joining surface 514, but the invention is not limited thereto, and the latter may be larger than or the same as the former.

In this case, for example, a pressing portion which presses the first bottom of the movable substrate 52 from an opposite side to the fixed substrate 51 is provided in the casing 610. In addition, the pressing portion may press the first bottom to the fixed substrate 51 side, so as to bring the movable extraction electrode 562A and the movable connection electrode 562B into pressing contact with each other.

In the first to third embodiments, a configuration in which the first groove and the first connection portion and the corresponding third groove and second connection portion are provided has been exemplified. In addition, in the fourth embodiment and the modification example thereof, a configuration in which the first groove and the third groove are provided has been exemplified, but the invention is not limited. For example, there may be a configuration in which the third groove and the second connection portion are not provided. Further, a configuration may be employed in which a set of three or more grooves and connection portions are provided at positions which are rotationally symmetrical with respect to the plane central point O which is a rotationally symmetrical center of the second groove. This is also the same for a configuration in which a connection portion is not provided, and the first groove is directly connected to the second groove. Also in this case, a stress can be balanced, and thus it is possible to minimize deflection of the substrate.

In the above-described respective embodiments and modification example, a description has been made of an example of applying the invention to the electrode structure in which the movable electrode 562 provided on the movable substrate 52 is connected to the movable electrode pad 562P provided on the fixed substrate 51 in order to apply a voltage to the electrostatic actuator 56, but the invention is not limited thereto. In other words, the invention is also applicable to an electrode structure for connecting an electrode provided on one substrate to an electrode provided on the other substrate, for example, electrodes such as a capacitance detection electrode or an antistatic electrode.

In addition, in the above-described respective embodiments and modification example, a description has been made of the wavelength variable interference filter 5 or 5A which is a wavelength variable type Fabry-Perot Etalon filter, but the invention is not limited thereto. In other words, a wavelength invariable type Fabry-Perot Etalon filter which does not include the electrostatic actuator 56 may be used. In this case, the inter-substrate connection structure of the invention may be used as a connection structure of other electrodes such as, for example, the above-described capacitance detection electrode or antistatic electrode.

In addition, in the above-described respective embodiments and modification example, the wavelength variable interference filter or the interference filter has been exemplified as a MEMS element according to the invention, but the invention is not limited thereto.

The invention is suitably applicable to an MEMS element which includes at least a pair of substrates respectively provided with electrodes and has an electrode structure in which the electrode provided on one substrate is electrically connected to the electrode provided on the other substrate. Such a MEMS element is not particularly limited, and may be, for example, an optical element such as a mirror device which can minutely change alight reflection direction, or a piezoelectric vibration device.

In addition, in the above-described respective embodiments, the spectrometry apparatus 1 has been exemplified as an electronic apparatus according to the invention, but the wavelength variable interference filter 5, the optical module, and the electronic apparatus according to the invention are applicable to other various fields.

For example, the electronic apparatus according to the invention is applicable to a colorimetry apparatus for measuring a color.

Figure 12:
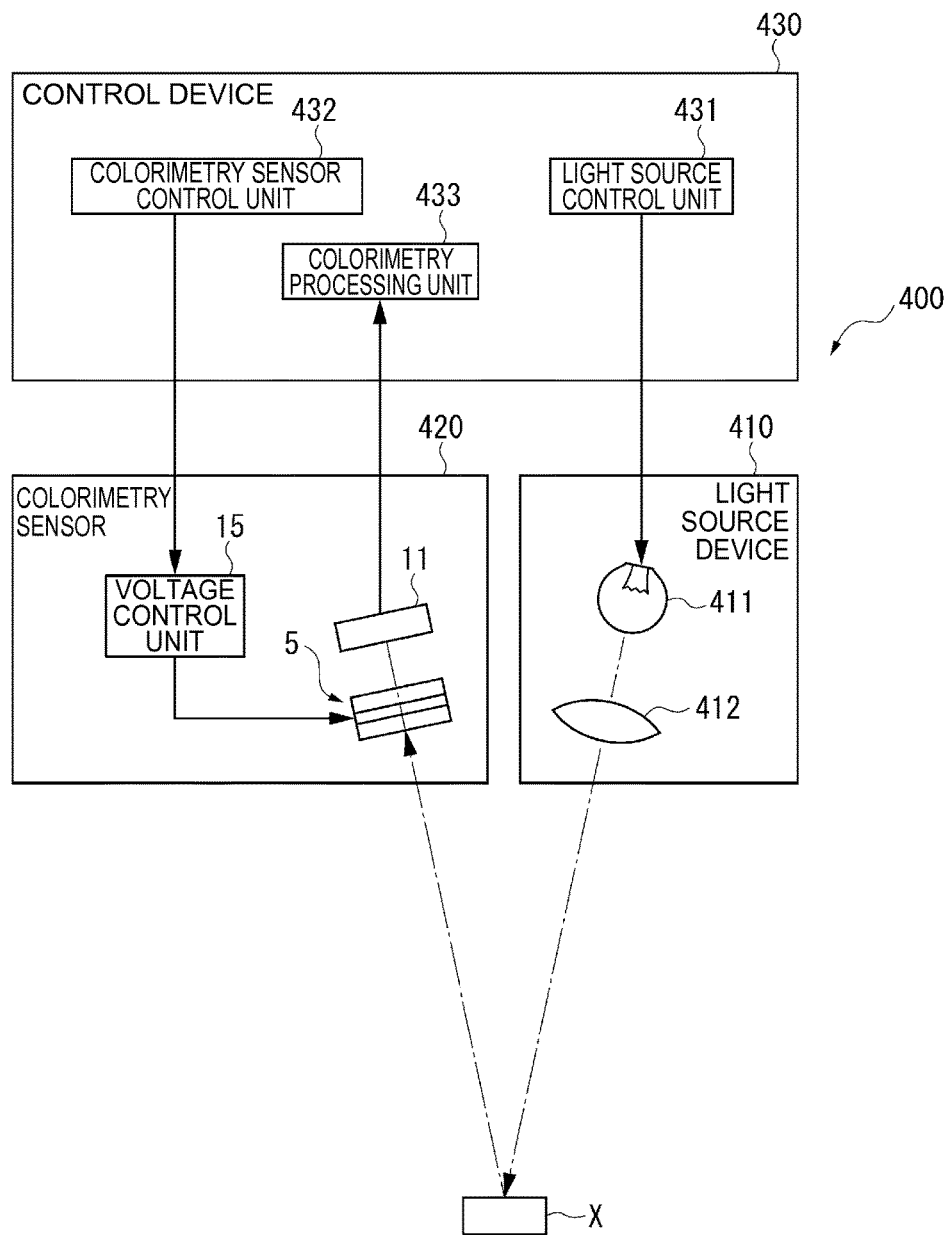
FIG. 12 is a schematic diagram illustrating a colorimetry apparatus which is an example of an electronic apparatus according to the invention.

FIG. 12 is a block diagram illustrating an example of a colorimetry apparatus 400 having the wavelength variable interference filter 5.

The colorimetry apparatus 400, as illustrated in FIG. 12, includes a light source device 410 which emits light to a measurement target X, a colorimetry sensor 420 (optical module), and a control device 430 (controller) which controls an entire operation of the colorimetry apparatus 400. In addition, the colorimetry apparatus 400 is an apparatus in which light emitted from the light source device 410 is reflected by the measurement target X, the reflected measurement target light is received by the colorimetry sensor 420, and a chromaticity of the measurement target light, that is, a color of the measurement target X is analyzed and measured on the basis of a detection signal output from the colorimetry sensor 420.

The light source device 410 includes a light source 411 and a plurality of lenses 412 (only one lens is illustrated in FIG. 12), and emits, for example, reference light (for example, white light) to the measurement target X. In addition, the plurality of lenses 412 may include a collimator lens, and, in this case, the light source device 410 converts the reference light emitted from the light source 411 into parallel light by using the collimator lens, and emits the parallel light toward the measurement target X from a projection lens (not illustrated). Further, in the present embodiment, the colorimetry apparatus 400 including the light source device 410 is exemplified, but, for example, in a case where the measurement target X is a light emitting member such as a liquid crystal panel, the light source device 410 may not be provided.

The colorimetry sensor 420, as illustrated in FIG. 12, includes the wavelength variable interference filter 5, the detector 11 which receives light transmitted through the wavelength variable interference filter 5, and the voltage control unit 15 which controls a voltage applied to the electrostatic actuator 56 of the wavelength variable interference filter 5. In addition, the colorimetry sensor 420 includes an incidence optical lens (not illustrated) which guides reflective light (measurement target light) reflected by the measurement target X to inside thereof at a position opposing the wavelength variable interference filter 5. Further, in the colorimetry sensor 420, light of a predetermined wavelength among measurement target light beams which are incident from the incidence optical lens is spectrally diffracted by the wavelength variable interference filter 5, and the spectrally diffracted light is received by using the detector 11.

The control device 430 is a controller according to the invention, and controls an entire operation of the colorimetry apparatus 400.

As the control device 430, for example, a general purpose personal computer, a portable information terminal, a colorimetry-dedicated computer, or the like may be used. In addition, the control device 430, as illustrated in FIG. 12, includes a light source control unit 431, a colorimetry sensor control unit 432, a colorimetry processing unit 433, and the like.

The light source control unit 431 is connected to the light source device 410, and outputs a predetermined control signal to the light source device 410 on the basis of, for example, an input set by a user, so as to allow white light with predetermined brightness to be emitted.

The colorimetry sensor control unit 432, which is connected to the colorimetry sensor 420, sets a wavelength of light which is to be received by the colorimetry sensor 420 on the basis of, for example, an input set by a user, and outputs a command signal for detecting a light reception amount of the light with the wavelength to the colorimetry sensor 420. Accordingly, the voltage control unit 15 of the colorimetry sensor 420 applies a voltage to the electrostatic actuator 56 on the basis of a control signal, so as to drive the wavelength variable interference filter 5.

The colorimetry processing unit 433 analyzes a chromaticity of the measurement target X on the basis of the light reception amount detected by the detector 11. In addition, the colorimetry processing unit 433 may estimate an optical spectrum S by using an estimation matrix Ms with the light amount obtained by the detector 11 as a measurement spectrum D, thereby analyzing a chromaticity of the measurement target X, in the same manner as in the first and second embodiments.

In addition, another example of an electronic apparatus according to the invention may include an optical base system for detecting presence of a specific substance. Such a system may exemplify an in-vehicle gas leakage detector which employs a spectrometry method using, for example, the wavelength variable interference filter 5 according to the invention, and detects a specific gas with high sensitivity, or a gas detection apparatus such as a photoacoustic rare gas detector for testing expiration.

An example of such a gas detection apparatus will be described below with reference to the drawings.

Figure 13:
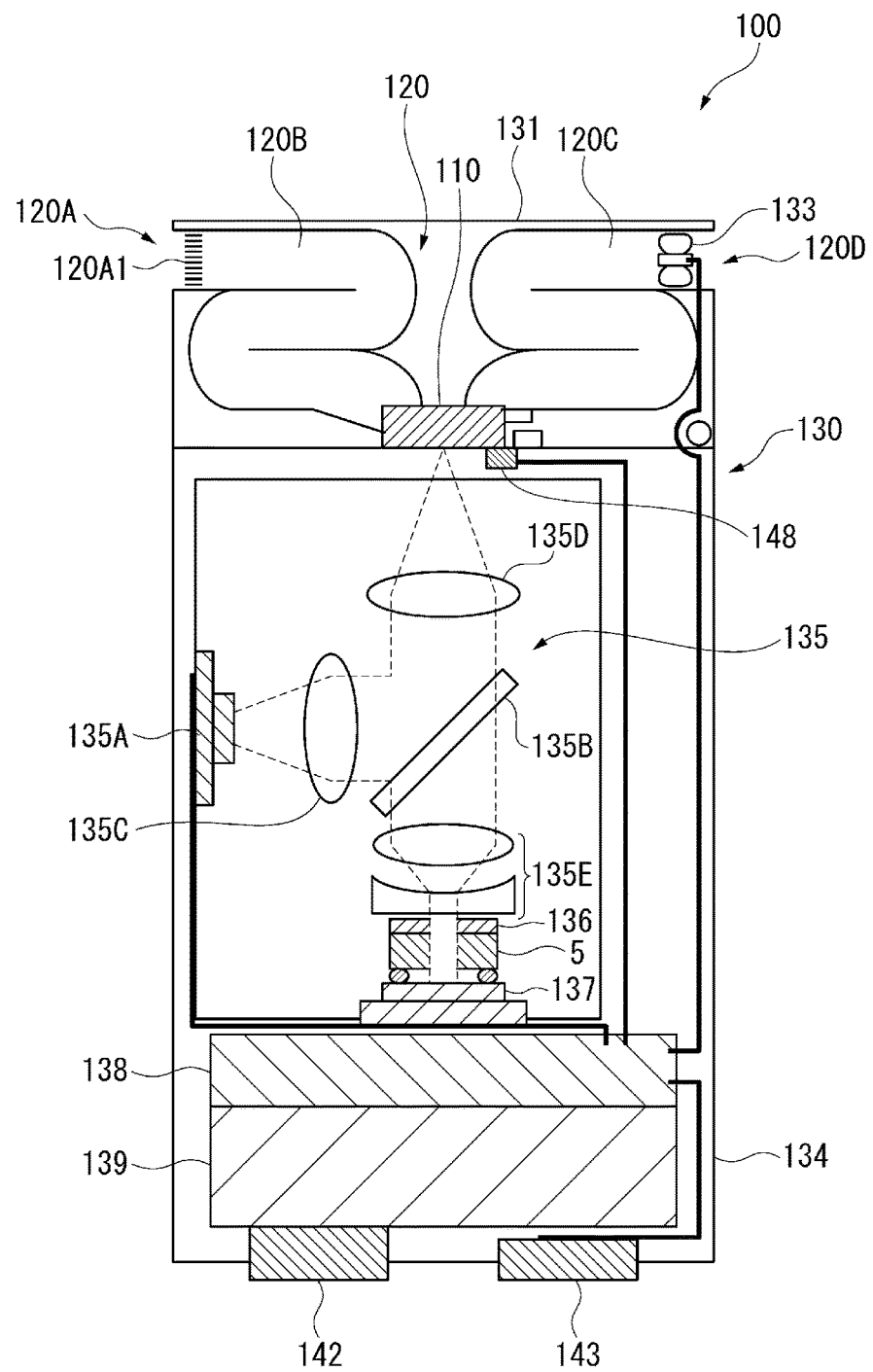
FIG. 13 is a schematic diagram illustrating a gas detection apparatus which is an example of an electronic apparatus according to the invention.

FIG. 13 is a schematic diagram illustrating an example of a gas detection apparatus having the wavelength variable interference filter 5.

Figure 14:
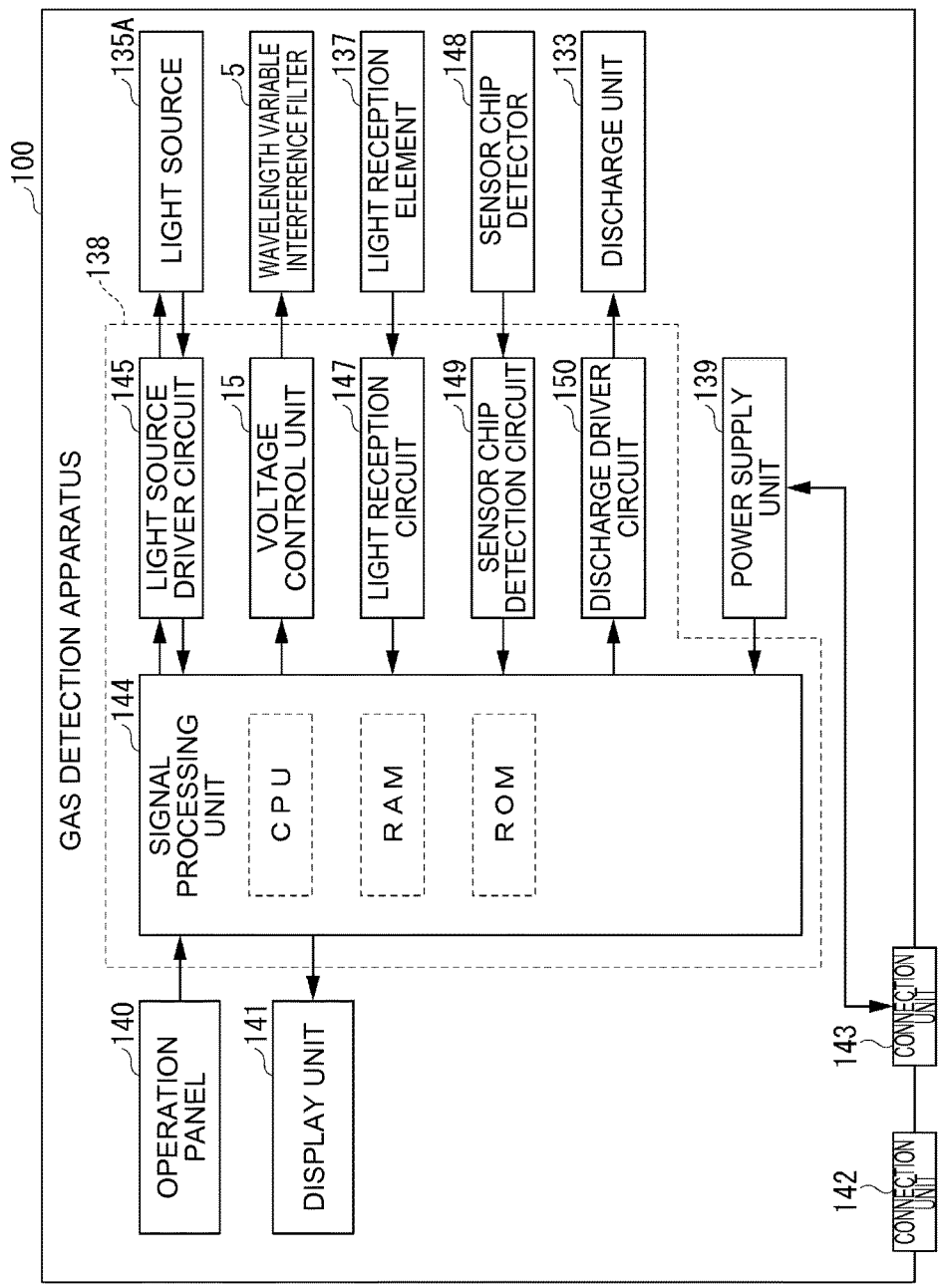
FIG. 14 is a block diagram illustrating a configuration of a control system of the gas detection apparatus of FIG. 13.

FIG. 14 is a block diagram illustrating a configuration of a control system of the gas detection apparatus of FIG. 13.

The gas detection apparatus 100, as illustrated in FIG. 13, includes a sensor chip 110, a flow channel 120 having a suction port 120A, a suction flow channel 120B, a discharge flow channel 120C, and a discharge port 120D, and a main body 130.

The main body 130 is constituted by a detection device including a sensor unit cover 131 having an opening which allows the flow channel 120 to be attachable and detachable, a discharge unit 133, a casing 134, an optical unit 135, a filter 136, the wavelength variable interference filter 5, a light reception element 137 (detection unit), and the like; a controller 138 which processes a detected signal and controls the detection unit; a power supply unit 139 which supplies power; and the like. In addition, the optical unit 135 includes a light source 135A which emits light; a beam splitter 135B which reflects light incident from the light source 135A to the sensor chip 110 side and transmits light incident from the sensor chip side through the light reception element 137 side; and lenses 135C, 135D and 135E.

In addition, as illustrated in FIG. 14, an operation panel 140, a display unit 141, a connection unit 142 for interfacing with external devices, and the power supply unit 139 are provided on a surface of the gas detection apparatus 100. In a case where the power supply unit 139 is a secondary battery, a connection unit 143 for charging may be provided.

Further, the controller 138 of the gas detection apparatus 100, as illustrated in FIG. 14, includes a signal processing unit 144 constituted by a CPU and the like; a light source driver circuit 145 which controls the light source 135A; a voltage control unit 146 which controls the wavelength variable interference filter 5; a light reception circuit 147 which receives a signal from the light reception element 137; a sensor chip detection circuit 149 receiving a signal from a sensor chip detector 148 which reads a code of the sensor chip 110 and detects presence or absence of the sensor chip 110; a discharge driver circuit 150 which controls the discharge unit 133; and the like. Furthermore, the gas detection apparatus 100 includes a storage unit (not illustrated) which stores V-λ data.

Next, an operation of the above-described gas detection apparatus 100 will be described below.

The sensor chip detector 148 is provided inside the sensor unit cover 131 on the upper part of the main body 130, and detects presence or absence of the sensor chip 110. When a detection signal from the sensor chip detector 148 is detected, the signal processing unit 144 determines that the sensor chip 110 is installed, and outputs a display signal for displaying that a detection operation can be performed on the display unit 141.

In addition, for example, when the operation panel 140 is operated by a user, and an instruction signal indicating that a detection process starts is output from the operation panel 140 to the signal processing unit 144, first, the signal processing unit 144 outputs a signal for starting the light source to the light source driver circuit 145 so as to start the light source 135A. When the light source 135A starts to be driven, laser light having a single wavelength and stable linear polarization is emitted from the light source 135A. In addition, the light source 135A has a built-in temperature sensor or a light amount sensor, and outputs information thereon to the signal processing unit 144. Further, the signal processing unit 144 controls the discharge driver circuit 150 so as to start the discharge unit 133 when it is determined that the light source 135A is stably operated on the basis of a temperature or a light amount input from the light source 135A. Accordingly, a gas sample including a target substance (gas molecules) to be detected is guided from the suction port 120A to the suction flow channel 120B, the inside of the sensor chip 110, the discharge flow channel 120C, and the discharge port 120D. Furthermore, the suction port 120A is provided with a dust removing filter 120A1, and relatively large dust, some water vapor, or the like is removed.

The sensor chip 110 is a sensor into which a plurality of metal nano-structure bodies are incorporated, and which uses localized surface plasmon resonance. In this sensor chip 110, if an enhanced electric field is formed between the metal nano-structure bodies by laser light, and gas molecules enter the enhanced electric field, Raman scattering light and Rayleigh scattering light including molecular vibration information are generated.

The Raman scattering light and Rayleigh scattering light are incident to the filter 136 through the optical unit 135 so that the Rayleigh scattering light is separated by the filter 136, and the Raman scattering light is incident to the wavelength variable interference filter 5. In addition, the signal processing unit 144 outputs a control signal to the voltage control unit 146. Accordingly, as described in the first embodiment, the voltage control unit 146 reads a voltage value corresponding to a measurement target wavelength from the storage unit, and applies the voltage to the electrostatic actuator 56 of the wavelength variable interference filter 5 so that the Raman scattering light corresponding to the gas molecule which is a detection target is spectrally diffracted by the wavelength variable interference filter 5. Next, when the spectrally diffracted light is received by the light reception element 137, a light reception signal corresponding to the light reception amount is output to the signal processing unit 144 via the light reception circuit 147. In this case, the aimed Raman scattering light can be extracted from the wavelength variable interference filter 5 with high accuracy.

The signal processing unit 144 compares spectral data on the Raman scattering light corresponding to the gas molecule which is a detection target, obtained in this way, with data stored in a ROM, and determines whether or not the gas molecule is an aimed gas molecule so as to specify a substance. In addition, the signal processing unit 144 displays result information on the display unit 141, or outputs the result information from the connection unit 142 to an external device.

In addition, in FIGS. 13 and 14, the gas detection apparatus 100 has been exemplified in which Raman scattering light is spectrally diffracted by the wavelength variable interference filter 5, and a gas is detected from the spectrally diffracted Raman scattering light, but a gas detection apparatus may be used which specifies the kind of gas by detecting absorbance unique to gas. In this case, a gas sensor, which allows a gas to flow into the sensor and detects light which is absorbed by the gas among incident light beams, is used as the optical module according to the invention. In addition, a gas detection apparatus which analyzes and discriminates the gas which is made to flow into the sensor by the gas sensor is used as the electronic apparatus according to the invention. Also with this configuration, it is possible to detect a component of a gas by using the wavelength variable interference filter 5.

In addition, a system for detecting presence of a specific substance is not limited to the above-described gas detection apparatus, and may exemplify a substance component analysis apparatus such as an apparatus for noninvasive measurement of a saccharide using near-infrared spectroscopy, or an apparatus for noninvasive measurement of information on food, a living body, a mineral, or the like.

Hereinafter, a food analysis apparatus will be described as an example of the substance component analysis apparatus.

Figure 15:
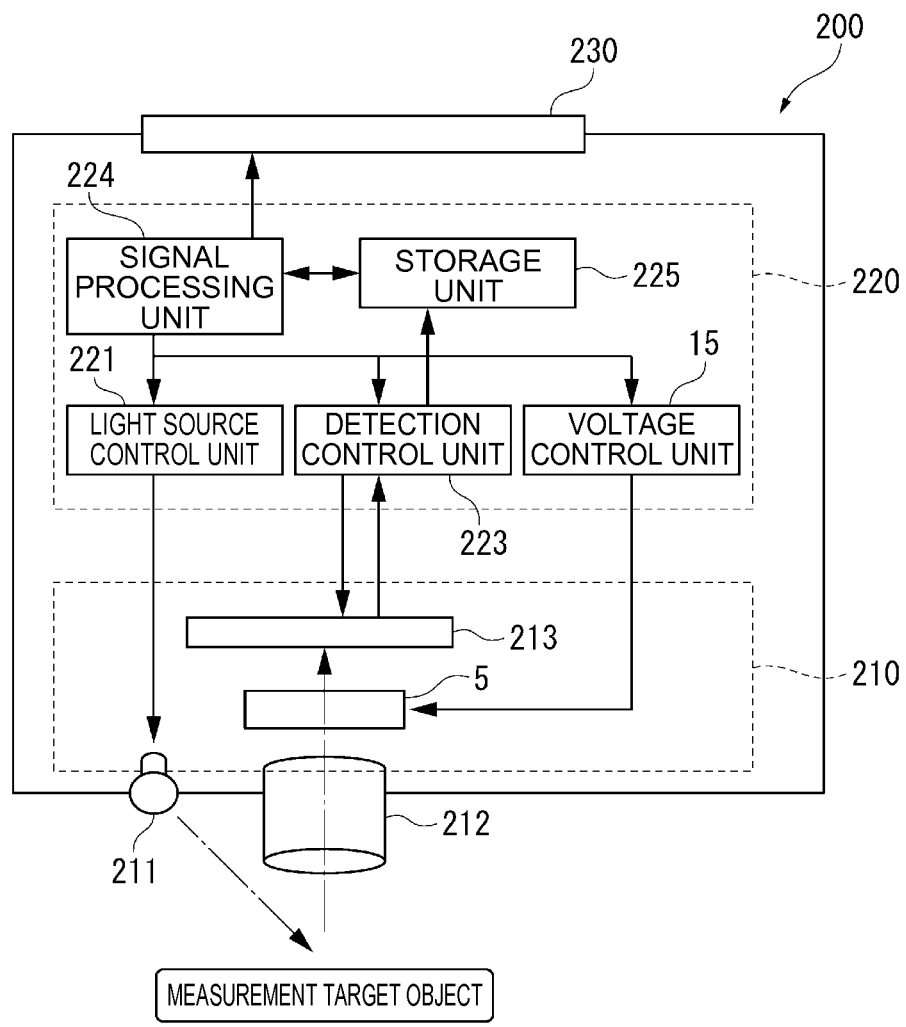
FIG. 15 is a diagram illustrating a schematic configuration of a food analysis apparatus which is an example of an electronic apparatus according to the invention.

FIG. 15 is a diagram illustrating a schematic configuration of a food analysis apparatus which is an example of the electronic apparatus using the wavelength variable interference filter 5.

The food analysis apparatus 200, as illustrated in FIG. 15, includes a detector 210 (optical module), a controller 220, and a display unit 230. The detector 210 includes a light source 211 which emits light; an imaging lens 212 into which light from a measurement target object is introduced; the wavelength variable interference filter 5 which spectrally diffracts the light introduced from the imaging lens 212; and an imaging unit 213 (detection unit) which detects the spectrally diffracted light.

In addition, the controller 220 includes a light source control unit 221 which controls turning on and off the light source 211 and controls brightness during turning-on of the light source; a voltage control unit 222 which controls the wavelength variable interference filter 5; a detection control unit 223 which controls the imaging unit 213 so as to acquire a spectroscopic image captured by the imaging unit 213; a signal processing unit 224; and a storage unit 225.

When the system of the food analysis apparatus 200 is driven, the light source 211 is controlled by the light source control unit 221, and thus a measurement target object is irradiated with light by the light source 211. In addition, the light reflected by the measurement target object is incident to the wavelength variable interference filter 5 through the imaging lens 212. The wavelength variable interference filter 5 is driven in the same method as in the first embodiment or the second embodiment under the control of the voltage control unit 222. Accordingly, it is possible to extract light with an aimed wavelength from the wavelength variable interference filter 5 with high accuracy. In addition, the extracted light is imaged by the imaging unit 213 formed by, for example, a CCD camera or the like. Further, the imaged light is accumulated in the storage unit 225 as a spectroscopic image. The signal processing unit 224 controls the voltage control unit 222 so as to change a value of a voltage applied to the wavelength variable interference filter 5, thereby acquiring a spectroscopic image for each wavelength.

The signal processing unit 224 performs a calculation process on pixel data of each image accumulated in the storage unit 225 so as to obtain a spectrum of each pixel. In addition, the storage unit 225 stores, for example, information regarding a component of food for a spectrum, and the signal processing unit 224 analyzes data on the obtained spectrum on the basis of the information regarding food stored in the storage unit 225 so as to obtain a food component included in a detection target and a content thereof. Further, food calorie, freshness, and the like can be calculated from the obtained food component and the content thereof. Furthermore, it is possible to perform extraction or the like of a part whose freshness is reduced in food which is an inspection target by analyzing a spectral distribution in an image, and it is also possible to detect a foreign substance included in the food.

In addition, the signal processing unit 224 performs a process of displaying information such as the component of the food which is an inspection target, the content, the calorie, and the freshness obtained in the above-described way on the display unit 230.

In addition, in FIG. 15, the food analysis apparatus 200 is exemplified, but may also be used as an apparatus for noninvasive measurement of the above-described other information by using the substantially same configuration. For example, the food analysis apparatus may be used as a living body analysis apparatus which performs analysis of a living body component, such as analysis and measurement of a component of a body fluid such as blood. If such a living body analysis apparatus is used as an apparatus which measures a component of a body fluid such as blood so as to detect ethyl alcohol therein, the apparatus may be used as an intoxicated driving prevention apparatus which detects a drunk state of a driver. Further, the food analysis apparatus may also be used as an electronic endoscope system including such a living body analysis apparatus.

In addition, the food analysis apparatus may also be used as a mineral analysis apparatus which performs a mineral component analysis.

Further, the wavelength variable interference filter, the optical module, and the electronic apparatus according to the invention are applicable to the following apparatuses.

For example, data can be transferred by light with each wavelength by changing an intensity of the light with each wavelength over time. In this case, light with a specific wavelength is spectrally diffracted by the wavelength variable interference filter 5 provided in an optical module and is received by a light reception unit, and thus data transferred by the light with a specific wavelength can be extracted. Therefore, data of light with each wavelength is processed by an electronic apparatus having the data extraction optical module, thereby allowing optical communication to be performed.

In addition, the electronic apparatus is applicable to a spectroscopic camera, a spectroscopic analyzer, and the like which capture a spectroscopic image by spectrally diffracting light with the wavelength variable interference filter according to the invention. An example of the spectroscopic camera may include an infrared camera which has the built-in wavelength variable interference filter 5.

Figure 16:
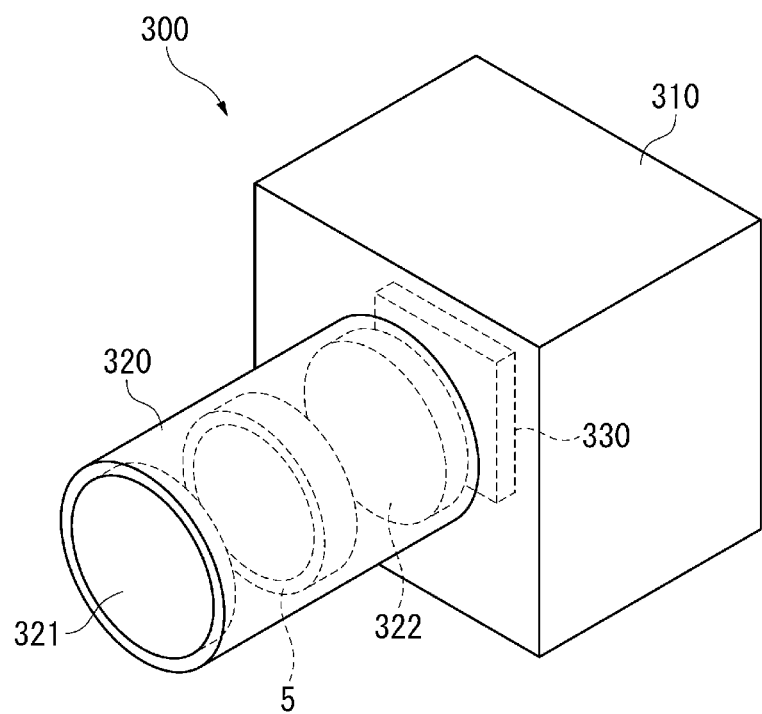
FIG. 16 is a diagram illustrating a schematic configuration of a spectroscopic camera which is an example of an electronic apparatus according to the invention.

FIG. 16 is a diagram illustrating a schematic configuration of a spectroscopic camera. The spectroscopic camera 300, as illustrated in FIG. 16, includes a camera main body 310, an imaging lens unit 320, and an imaging unit 330 (detection unit).

The camera main body 310 is a part held and operated by a user.

The imaging lens unit 320 is provided in the camera main body 310, and guides incident image light to the imaging unit 330. In addition, the imaging lens unit 320, as illustrated in FIG. 16, includes an objective lens 321, an image forming lens 322, and the wavelength variable interference filter 5 provided between the lenses.

The imaging unit 330 is formed by a light reception element, and images the image light guided by the imaging lens unit 320.

In the spectroscopic camera 300, the wavelength variable interference filter 5 transmits light with a wavelength which is an imaging target therethrough, and thus it is possible to capture a spectroscopic image of light with a desired wavelength.

In addition, the wavelength variable interference filter according to the invention may be used as a band-pass filter, and may be used in, for example, an optical laser apparatus in which, among light beams in a predetermined wavelength band emitted by a light emitting element, only light in a narrow band centering on a predetermined wavelength is spectrally diffracted and transmitted by the wavelength variable interference filter 5.

Further, the wavelength variable interference filter according to the invention may be used in a living body authentication apparatus, and is also applicable to, for example, authentication apparatuses of a blood vessel, a fingerprint, retina, iris, and the like, using light in a near-infrared region or a visible region.

Furthermore, the optical module and the electronic apparatus may be used as a concentration detection apparatus. In this case, infrared energy (infrared light) emitted from a substance is spectrally diffracted and analyzed by the wavelength variable interference filter 5, and thus a subject concentration in a sample is measured.

As described above, the wavelength variable interference filter, the optical module, and the electronic apparatus according to the invention are applicable to any apparatus which spectrally diffracts predetermined light from incident light. In addition, the wavelength variable interference filter according to the invention can spectrally diffract a plurality of wavelengths with a single device as described above, and thus it is possible to measure spectra of a plurality of wavelengths and detect a plurality of components with high accuracy. Therefore, miniaturization of an optical module or an electronic apparatus can be promoted as compared with an apparatus of the related art which extracts a desired wavelength by using a plurality of devices, and thus the optical module or the electronic apparatus can be suitably used as, for example, a portable or in-vehicle optical device.

In addition, a specific structure at the time when the invention is implemented may be configured by combining the above-described respective embodiments and modification examples as appropriate in the scope in which the object of the invention can be achieved, and may be changed to other structures as appropriate.

The entire disclosure of Japanese Patent Application No. 2013-156420 filed on Jul. 29, 2013 is expressly incorporated by reference herein.

What is claimed is:

1. An interference filter comprising:
   a first substrate, the first substrate being a fixed substrate;
   a second substrate that faces the first substrate, the second substrate being a movable substrate;
   a first reflective film that is provided on the first substrate;
   a second reflective film that is provided on the second substrate and faces the first reflective film;
   a first electrode that is provided on the first substrate; and
   a second electrode that is provided on the second substrate and is in contact with the first electrode at a connection position,
   wherein the second substrate includes
      a first groove that is provided at the connection position in a plan view; and
      a second groove that is connected to the first groove, the first groove having a first edge that extends to the second groove in a plan view, and
   wherein a first thickness of the second substrate at the first groove and a second thickness of the second substrate at the second groove are less than a third thickness of the second substrate at a location where the second reflective film overlaps the second substrate.

2. The interference filter according to claim 1, further comprising:

a connection portion that connects a first bottom of the first groove to a second bottom of the second groove, and is coplanar with the first bottom and the second bottom.

3. The interference filter according to claim 2, wherein the connection portion is provided in a direction of a straight line which connects the first bottom to the second bottom in the shortest distance in the plan view.

4. The interference filter according to claim 2, wherein the second substrate includes a thick portion that is provided between the first groove and the second groove and has a larger thickness dimension than a thickness dimension of the first groove and the second groove, and
the connection portion is provided so as to go around the thick portion in the plan view.

5. The interference filter according to claim 2, wherein the connection portion has a dimension in a width direction intersecting a connecting direction, the dimension being smaller than a dimension of the first bottom in the width direction at a position where the first bottom and the connection portion are connected to each other in the plan view.

6. The interference filter according to claim 1, wherein the second substrate includes a movable portion provided with the second reflective film, and
the second groove holds the movable portion movably in the thickness direction.

7. The interference filter according to claim 6, further comprising:
a third groove that has a same shape as the first groove, wherein the second groove has a rotationally symmetrical shape in the plan view, and
the first groove and the third groove are provided at positions which are rotationally symmetrical to each other with respect to a symmetrical center of the second groove.

8. An optical filter device comprising:
the interference filter according to claim 1; and
a casing that stores the interference filter therein.

9. An optical module comprising:
the interference filter according to claim 1; and
a detection unit that detects light extracted by the first reflective film and the second reflective film.

10. An electronic apparatus comprising:
the interference filter according to claim 1; and
a controller that controls the interference filter.

11. A MEMS element comprising:
a first substrate, the first substrate being a fixed substrate;
a second substrate that faces the first substrate, the second substrate being a movable substrate;
a first electrode that is provided on the first substrate; and
a second electrode that is provided on the second substrate and is in contact with the first electrode at a connection position,
wherein the second substrate includes
a first groove that is provided at the connection position in a plan view, and
a second groove that is connected to the first groove, the first groove having a first edge that extends to the second groove in a plan view, and
wherein a first thickness of the second substrate at the first groove and a second thickness of the second substrate at the second groove are less than a third thickness of the second substrate at a location where a reflective film overlaps the second substrate.

12. The interference filter according to claim 1, wherein the second electrode that is provided on the second substrate is always in contact with the first electrode at the connection position when the first and second substrate are joined together.

13. The MEMS element according to claim 11, wherein the second electrode that is provided on the second substrate is always in contact with the first electrode at the connection position when the first and second substrate are joined together.

14. An interference filter comprising:
a fixed substrate having a first reflective film;
a movable substrate that faces the fixed substrate, and has a second reflective film that faces the first reflective film;
a first electrode provided on the fixed substrate; and
a second electrode provided on the movable substrate, the second electrode being in contact with the first electrode at a connection position,
wherein the movable substrate includes
a linear groove that is provided at the connection position in a plan view; and
an annular groove that is connected to the linear groove, the annular groove encircling the second reflective film in the plan view, and the linear groove extending radially outward from the annular groove in the plan view, and
wherein, in a direction from the first reflective film toward the second reflective film, the movable substrate has a thickness at each of the linear groove and annular groove that is less than a thickness of the movable substrate at a location where the second reflective film overlaps the movable substrate.

15. The interference filter according to claim 1, wherein the first groove has a second edge that extends to the second groove, and a third edge that extends between the first edge and the second edge in a plan view.

* * * * *